United States Patent
Kim et al.

(10) Patent No.: US 8,160,013 B2
(45) Date of Patent: Apr. 17, 2012

(54) METHOD OF TRANSMITTING DATA IN MULTI-CELL COOPERATIVE WIRELESS COMMUNICATION SYSTEM

(75) Inventors: Byoung-Hoon Kim, Anyang-si (KR); Hanbyul Seo, Anyang-si (KR); Hyungtae Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 484 days.

(21) Appl. No.: 12/453,065

(22) Filed: Apr. 28, 2009

(65) Prior Publication Data

US 2010/0041409 A1    Feb. 18, 2010

Related U.S. Application Data

(60) Provisional application No. 61/088,344, filed on Aug. 12, 2008, provisional application No. 61/099,899, filed on Sep. 24, 2008.

(30) Foreign Application Priority Data

Nov. 5, 2008    (KR) .................. 10-2008-0109481
Nov. 5, 2008    (KR) .................. 10-2008-0109482

(51) Int. Cl.
    *H04W 72/04*    (2009.01)

(52) U.S. Cl. .................. 370/329; 370/252; 455/450

(58) Field of Classification Search .................. None
See application file for complete search history.

(56) References Cited

U.S. PATENT DOCUMENTS

| | | |
|---|---|---|
| 5,801,639 A | 9/1998 | Dorenbosch et al. |
| 2002/0193133 A1 | 12/2002 | Shibutani |
| 2006/0209767 A1 | 9/2006 | Chae et al. |
| 2007/0097899 A1 | 5/2007 | Larsson et al. |
| 2008/0227422 A1* | 9/2008 | Hwang et al. .............. 455/278.1 |
| 2010/0035555 A1* | 2/2010 | Bala et al. .................. 455/63.1 |
| 2010/0172263 A1* | 7/2010 | Kuroda et al. .............. 370/252 |

OTHER PUBLICATIONS

Tuninetti, D.; Yang Weng; , "On the Han-Kobayashi achievable region for Gaussian interference channels," Information Theory, 2008. ISIT 2008. IEEE International Symposium on , vol., No., pp. 240-244, Jul. 6-11, 2008.*

Yi Cao; Biao Chen; , "An achievable rate region for discrete memoryless broadcast channels with confidential messages," Information Theory, 2008. ISIT 2008. IEEE International Symposium on , vol., No., pp. 2207-2211, Jul. 6-11, 2008.*

Te Han; Kobayashi, K.; , "A new achievable rate region for the interference channel," Information Theory, IEEE Transactions on , vol. 27, No. 1, pp. 49-60, Jan. 1981.*

* cited by examiner

*Primary Examiner* — Robert Scheibel
(74) *Attorney, Agent, or Firm* — McKenna Long & Aldridge LLP

(57) ABSTRACT

A method of transmitting data in a multi-cell cooperative wireless communication system is provided. The method includes dividing the data into common data and private data, determining a transmission rate and/or a transmission power of the common data and the private data, respectively and transmitting the common data and the private data at the determined transmission rate and/or transmission power. It is possible to mitigate inter-cell interference and improve the performance of the system.

6 Claims, 14 Drawing Sheets

METHOD OF TRANSMITTING DATA IN MULTI-CELL COOPERATIVE WIRELESS COMMUNICATION SYSTEM

CROSS-REFERENCE TO RELATED APPLICATIONS

This application claims the benefit of priority of U.S. Provisional Application No. 61/088,344 filed on Aug. 12, 2008, U.S. Provisional Application No. 61/099,899 filed on Sep. 24, 2008, Korean Patent Application No. 10-2008-0109481 filed on Nov. 5, 2008, and Korean Patent Application No. 10-2008-0109482 filed on Nov. 5, 2008, which are incorporated by reference in their entirety herein.

BACKGROUND

1. Technical Field

The present invention relates to wireless communications and, more particularly, to methods of transmitting and processing data in a multi-cell cooperative wireless communication system.

2. Related Art

Next generation multimedia wireless communication system on which extensive research has been carried out is required to process various information, such as images, wireless data, etc., at a higher data transmission rate, beyond the voice-oriented services provided at an early stage.

Thus, Orthogonal Frequency Division Multiplexing (OFDM) having a high data transmission rate has recently attracted much attention. The OFDM is a multi-carrier modulation scheme that divides a frequency band into a plurality of orthogonal subcarriers to transmit data. Orthogonal Frequency Division Multiple Access (OFDMA) allows multiple users to transmit data simultaneously by combining the OFDM with Frequency Division Multiple Access (FDMA), Time Division Multiple Access (TDMA), or Code Division Multiple Access (CDMA).

The wireless communication system includes a base station (BS) and at least one user equipment (UE). The user equipment may be fixed or movable and referred to as a mobile station (MS), a user terminal (UT), a subscriber station (SS), a wireless device, etc. The base station generally indicates a fixed station which communicates with the user equipment and referred to as a Node-B, a base transceiver system (BTS), an access point (AP), etc. Hereinafter, uplink (UL) means communication from the user equipment to the base station, and downlink (DL) means communication from the base station to the user equipment.

The wireless communication system has a cell structure to provide an efficient system configuration. The cell is one of a plurality of areas divided from a large area to efficiently use frequencies. In general, the base station is located at the center of the cell to serve the user equipment, and the cell is defined as a service area to which one base station provides a communication service.

When neighboring cells of the OFDM/OFDMA system in a multi-cell environment use the same subcarrier, it may cause interference to users, which is referred to as inter-cell interference. Especially, the inter-cell interference may have a significant effect on the user equipment located near the boundary of the cell. In the downlink, the user equipment located near the boundary of the cell receives strong interference from the neighboring cell. In the uplink, the user equipment located near the boundary of the cell causes strong interference to the neighboring cell and, further, has a low transmission rate due to path loss in the serving cell.

In order to reduce the inter-cell interference, the neighboring cells may use different subcarriers; however, radio resources that one base station can use is significantly reduced.

A multi-cell cooperative scheme has been proposed to reduce the inter-cell interference in the multi-cell environment. With the use of the multi-cell cooperative scheme, it is possible to improve communication performance of the user equipment located near the boundary of the cell. In connection with this, an extensive discussion on various methods of transmitting and processing data using the multi-cell cooperative scheme has continued to progress.

SUMMARY

The multi-cell cooperative scheme may be classified into several types according to data sharing between neighboring cells. Theoretically, sharing a larger amount of data between neighboring cells is advantageous to improve the system performance. However, in order to share data, signal information between the base station and the user equipment and between the base stations should be defined. Therefore, there are many problems in its implementation due to the use of additional bandwidth and the time delay for information transmission. Especially, in the case where the transmission data of the base station is shared, a separate controller of the base stations that participate in the cooperation should be provided and, further, it is necessary to perform centralized scheduling to determine the base station that transmits data and the kind and the amount of data to be transmitted. Therefore, the number of control signals is increased, and the expansion and environmental adaptation are reduced. Accordingly, it is preferable that the base stations cooperate with one another by exchanging a minimum number of control signals in a state where no data is shared between neighboring cells, which may include Fractional Frequency Reuse (FFR) and Inter-Cell Interference Coordination (ICIC).

According to the FFR and ICIC, since a neighboring cell transmits a signal at a reduced transmission power with respect to the time and frequency domain that a serving cell transmits a signal to a user equipment located at the boundary of the cell, the inter-cell interference can be reduced. The neighboring cell having reduced transmission power can transmit a signal to a user equipment located at the center of the cell, which can achieve a high transmission rate even at low transmission power, thus reducing the loss of spectral efficiency.

However, the neighboring cell does not use the maximum transmission power allocated to it to mitigate the interference. Therefore, the efficiency of resource utilization is reduced and the overall transmission rate is also reduced. That is, according to the FFR and ICIC, the performance of the user equipment located at the boundary of the cell is improved due to the mitigation of inter-cell interference; however, the throughput of the overall system is decreased.

A macro diversity system and an uplink power control can be used for improving uplink performance in multi cell cooperative schemes. The macro diversity system is the method that multiple neighboring base stations receive one signal, so a macro diversity effect is obtained. Accordingly, it is possible to improve performance of user equipment which is located at a boundary of a cell and has a low transmission rate because of path loss. Here, neighboring base stations which cooperate with each other do not perform their uplink service and combine signals received from other cells. According to this method, the base stations use radio resources inefficiently and has low throughput because they do not perform their uplink service. Moreover, since base stations which cooperate with each other share received signals, there may be overhead. The uplink power control reduces interference for neighboring cells by controlling transmission power of a user equipment suitably. That is, when a user equipment give high interference to a neighboring cell, a base station of the neighboring cell can request that the user equipment lower its transmission power. According to this method, it is possible to reduce interference which affects a neighboring cell. However, a transmission rate of the user equipment is reduced. That is, performance of the neighboring cell is improved, but throughput of an overall system is reduced.

Therefore, it is an object of the present invention to provide a method of transmitting and receiving data, which can reduce inter-cell interference. Especially, the present invention provides a method of improving the performance of a user equipment located at the boundary of a cell and improving the throughput of the overall system using a multi-cell cooperative scheme.

In one aspect, the present invention provides a method of transmitting data in a multi-cell cooperative wireless communication system, the method comprising: dividing the data into common data and private data, determining a transmission rate and/or a transmission power of the common data and the private data, respectively and transmitting the common data and the private data at the determined transmission rate and/or transmission power.

In another aspect, the present invention provides a method of processing data in a multi-cell cooperative wireless communication system, the method comprising: receiving common data and private data from a transmitting end of a neighboring cell and receiving private data from a transmitting end of a serving cell, restoring the common data received from the transmitting end of the neighboring cell to eliminate interference due to the common data and restoring the private data received from the transmitting end of the serving cell in a state where the interference due to the common data is eliminated.

In another aspect, the present invention provides a method of transmitting downlink data to a specific user equipment in a multi-cell cooperative wireless communication system, the method comprising: dividing the downlink data into common data and private data, determining a transmission rate and a transmission power of the common data and the private data, respectively and transmitting the common data and the private data at the determined transmission rate and transmission power.

Preferably, the transmission rate of the common data is determined such that the common data can be restored by the specific user equipment of a serving cell and a user equipment of a neighboring cell.

Preferably, the transmission rate of the common data is set to a small value between the transmission rate at which the common data can be restored by the specific user equipment of the serving cell and the transmission rate at which the common data can be restored by the user equipment of the neighboring cell.

Preferably, the transmission power of the private data or the common data is set to a level that can ensure a predetermined service quality required by the user equipment of the neighboring cell.

Preferably, the common data and the private data are transmitted via a multi-antenna.

Preferably, the common data is transmitted via a part of the multi-antenna.

Preferably, the private data is transmitted via a part of the multi-antenna.

Preferably, the common data and the private data are transmitted via a part of the multi-antenna, while superpositioning each other.

Preferably, the common data is transmitted using a dedicated pilot signal.

Preferably, the private data is transmitted using a dedicated pilot signal.

In another aspect, the present invention provides a method of processing downlink data in a multi-cell cooperative wireless communication system, the method comprising: receiving common data and private data from a neighboring cell and receiving private data from a serving cell, restoring the common data received from the neighboring cell to eliminate interference due to the common data and restoring the private data received form the serving cell in a state where the interference due to the common data is eliminated.

Preferably, a transmission rate of the common data is determined such that the common data can be restored by a user equipment of the serving cell and a user equipment of the neighboring cell.

Preferably, the common data and the private data from the neighboring cell include different reference signals.

Preferably, the method further comprises abandoning the common data if it is useless after eliminating the interference due to the common data.

Preferably, the method further comprises using the common data if it is useful after eliminating the interference due to the common data.

Preferably, the method further comprises transmitting control information to the neighboring cell, wherein the control information is used by the neighboring cell to determine the transmission rate and transmission power of the common data.

Preferably, the control information is a Signal to Interference and Noise Ratio (SINR) for the private data or the common data or an SINR for the entire signal received from the neighboring cell.

Preferably, the control information includes a transmission rate of the common data, which is set to a level at which the common data can be restored by the user equipment of the serving cell.

Preferably, the control information includes a transmission power of the private data or the common data, which is set to a level that can ensure a predetermined service quality required by the user equipment of the serving cell.

Preferably, the control information is transmitted directly to a base station of the neighboring cell or transmitted through a base station of the serving cell.

Preferably, the serving cell and the neighboring cell share scheduling information on time and frequency resources.

Preferably, if there is a plurality of common data, restoring each common data and eliminating interference are sequentially performed.

In another aspect, the present invention provides a method of transmitting uplink data in a multi-cell cooperative wireless communication system, the method comprising: dividing the uplink data into common data and private data, determining a transmission rate and/or a transmission power of the common data and the private data, respectively and transmitting the common data and the private data at the determined transmission rate and/or transmission power.

Preferably, the transmission rate of the common data is determined such that the common data can be restored by the specific base station of a serving cell and a base station of a neighboring cell.

Preferably, the transmission rate of the common data is set to a small value between the transmission rate at which the common data can be restored by the serving cell and the transmission rate at which the common data can be restored by the neighboring cell.

Preferably, the transmission power of the private data or the common data is set to a level that can ensure a predetermined service quality required by the neighboring cell.

Preferably, the common data and the private data are transmitted via a multi-antenna.

Preferably, the common data is transmitted via a part of the multi-antenna.

Preferably, the private data is transmitted via a part of the multi-antenna.

Preferably, the common data and the private data are transmitted via a part of the multi-antenna, while superpositioning each other.

In another aspect, the present invention provides a method of processing uplink data in a multi-cell cooperative wireless communication system, the method comprising: receiving common data and private data from a user equipment of a neighboring cell and receiving private data from a user equipment of a serving cell, restoring the common data received from a user equipment of the neighboring cell to eliminate interference due to the common data and restoring the private data received from a user equipment of the serving cell in a state where the interference due to the common data is eliminated.

Preferably, a transmission rate of the common data is determined such that the common data can be restored by the serving cell and the neighboring cell.

Preferably, the common data and the private data from the neighboring cell include different reference signals or different radio resource.

Preferably, the method further comprises abandoning the common data after eliminating the interference caused by the neighboring cell.

Preferably, the method further comprises transmitting control information to a user equipment of the neighboring cell, wherein the control information is used by the user equipment of the neighboring cell to determine the transmission rate and transmission power of the common data.

Preferably, the control information is a Signal to Interference and Noise Ratio (SINR) for the common data or a MCS (Modulation and Coding Scheme) level required for the common data.

Preferably, the control information includes a transmission rate of the common data, which is set to a level at which the common data can be restored by the serving cell.

Preferably, the control information includes a transmission power of the common data, which is set to a level that can ensure a predetermined service quality required by the serving cell.

Preferably, the control information is transmitted directly to a base station of the neighboring cell or transmitted through a base station of the serving cell.

Preferably, the control information is generated based on a channel estimating value, which is obtained by using reference signal received from the user equipment of the neighboring cell.

Preferably, the serving cell and the neighboring cell share scheduling information on time and frequency resources.

Preferably, if there is a plurality of common data, restoring each common data and eliminating interference are sequentially performed.

In another aspect, the present invention provides a method of processing uplink data in a multi-cell cooperative wireless communication system, the method comprising: receiving a first uplink data from a user equipment of a serving cell and receiving a second uplink data from a user equipment of a neighboring cell, eliminating interference by receiving a second uplink data from a base station of the neighboring cell and information required for restoring of the second uplink data, and restoring the first uplink data in a state where interference from the neighboring cell is eliminated.

Preferably, the second uplink data received from a base station of the neighboring cell is restored by combining the second data received by the serving cell and the neighboring cell.

Preferably, the step of eliminating interference comprises combining the second uplink data received from the user equipment of the neighboring cell and the second uplink data received from the base station of the neighboring cell and restoring the combined data.

Preferably, the method further comprises transmitting control information to the user equipment of the neighboring cell, wherein the control information is information that the user equipment of the neighboring cell uses for determining transmission rate and transmission power of the second uplink data.

Preferably, the control information indicates SINR on the second uplink data received from the user equipment of the neighboring cell.

Preferably, the control information includes a transmission power of the second uplink data, which is set to a level that can be restored by the serving cell.

Preferably, the control information indicates SINR on signal that combines the second uplink signal received by the serving cell with the second uplink signal received by the neighboring cell.

Preferably, the control information is transmitted directly to a base station of the neighboring cell or transmitted through a base station of the serving cell.

Preferably, the control information is generated based on a channel estimating value, which is obtained by using reference signal received from the user equipment of the neighboring cell.

In another aspect, the present invention provides a method of processing uplink data in a multi-cell cooperative wireless communication system, the method comprising: receiving a first uplink data from a user equipment of a serving cell and receiving a second uplink data and/or a third uplink data from a user equipment of a neighboring cell, eliminating interference by selectively applying a first process that uses the second and/or third uplink data received from a base station of the neighboring cell or a second process that restores the third uplink data received from the neighboring cell, and restoring the first uplink data in a state where interference from the neighboring cell is eliminated.

Preferably, a transmission data of the third uplink data is set to a level that can be restored by the serving cell and the neighboring cell.

Preferably, the first process and the second process are selectively applied based on ability for data exchange between adjacent cells.

Preferably, the serving cell and the neighboring cell share scheduling information on time and frequency resources.

In a multi-cell cooperative wireless communication system, the inter-cell interference is mitigated and the performance of the overall system is improved by exchanging a minimum number of control signals.

Especially, performance of transmitting and receiving data is improved by dividing into at least two kinds of data and determining appropriate transmission rate and transmission power thereof. Moreover, a user equipment which is located at a boundary of a cell can use allocated all transmission power and a neighboring cell can keep their performance.

DESCRIPTION OF EXEMPLARY EMBODIMENTS

Figure 1:
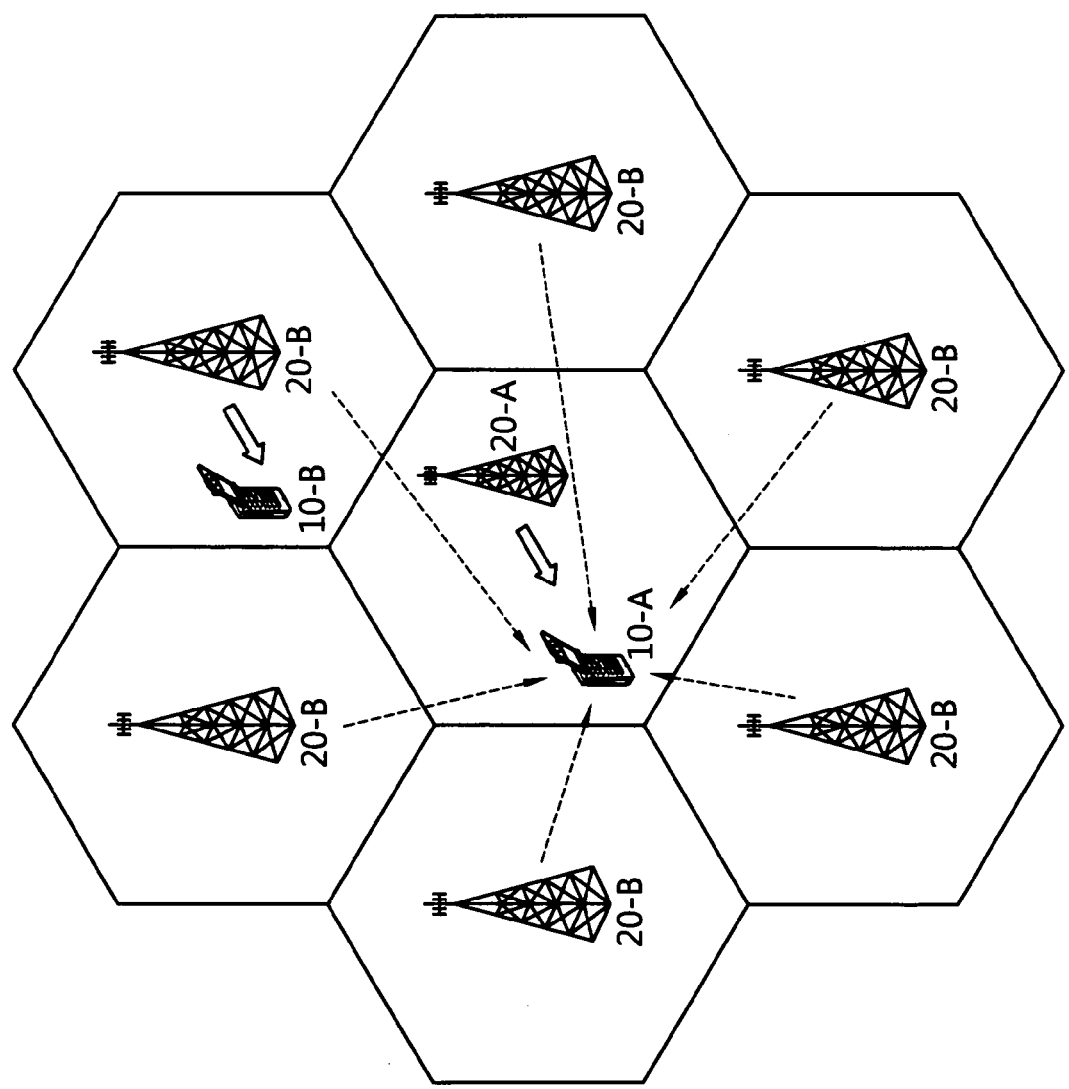
FIG. 1 is a schematic diagram showing a wireless communication system in a multi-cell environment.

FIG. 1 is a schematic diagram showing a wireless communication system in a multi-cell environment.

Referring to FIG. 1, a wireless communication system comprises a base station (BS) 20 and at least one user equipment (UE) 10. The wireless communication system may be an Orthogonal Frequency Division Multiplexing (OFDM)/Orthogonal Frequency Division Multiple Access (OFDMA)-based system. The OFDM uses a plurality of orthogonal subcarriers. The OFDM is implemented using Inverse Fast Fourier Transform (IFFT) and Fast Fourier Transform (FFT). A transmitter transmits data by performing IFFT on the data. A receiver restores original data by performing FFT on the received signal. The transmitter uses the IFFT to combine a plurality of subcarriers, and the receiver uses the corresponding FFT to separate the plurality of subcarriers. In the downlink, the transmitter may be a part of the base station 20 and the receiver may be a part of the user equipment 10. Similarly, in the uplink, the transmitter may be a part of the user equipment 10 and the receiver may be a part of the base station 20.

The base station 20 may include at least one cell. The cell is an area to which one base station 20 provides a communication service. A multi-cell may be formed when a plurality of base stations having at least one cell is arranged. A base station that provides a communication service to the user equipment 10 is referred to as a serving base station, and a base station adjacent to the serving base station is referred to as a neighboring base station. A cell of the serving base station is referred to as a serving cell, and a cell of the neighboring base station is referred to as a neighboring cell.

Assuming that base station-A (20-A) provides a communication service to user equipment-A (10-A) and base station-B (20-B) provides a communication service to user equipment-B (10-B), base station-A (20-A) is the serving base station and base station-B (20-B) is the neighboring base station with respect to user equipment-A (10-A). Moreover, base station-B (20-B) is the serving base station and base station-A (20-A) is the neighboring base station with respect to user equipment-B (10-B). Assuming that user equipment-A (10-A) and user equipment-B (10-B) are located at the boundary of each serving cell, base station-B (20-B) allocates radio resources and transmits downlink data DL DATA to user equipment-B (10-B) by scheduling. The downlink data transmitted from base station-B (20-B) may be received by user equipment-A (10-A) as well as by user equipment-B (10-B). Therefore, the downlink data of base station-B (20-B) may cause significant interference to user equipment-A (10-A). Meanwhile, base station-A (20-A) allocates radio resources by scheduling and user equipment-A (10-A) transmits uplink data (UL DATA) to base station-A (20-A) via the allocated radio resources. The uplink data transmitted from user equipment-A (10-A) may be received by base station-B (20-B) as well as by base station-A (20-A). Therefore, the uplink data of user equipment-A (10-A) may cause significant interference to base station-B (20-B). Since the OFDMA system has orthogonality between frequency domains in the same cell, the user equipments that use different frequency bands do not cause interference to each other. However, since the orthogonality is not maintained between the user equipments that use the same frequency band in neighboring cells, the interference may be caused. In the case where base station-A (20-A) and base station-B (20-B) cooperate with each other, antennas located at the respective base stations are operated in consideration of the user equipments located in other cells. That is, it can be considered as a multi-antenna system in which a plurality of antenna is scattered in a plurality of cells. Accordingly, the scheme in which base station-A (20-A) and base station-B (20-B) cooperate with each other may be referred to as a multi-cell cooperative scheme.

I. Downlink Data Transmission

Figure 2:
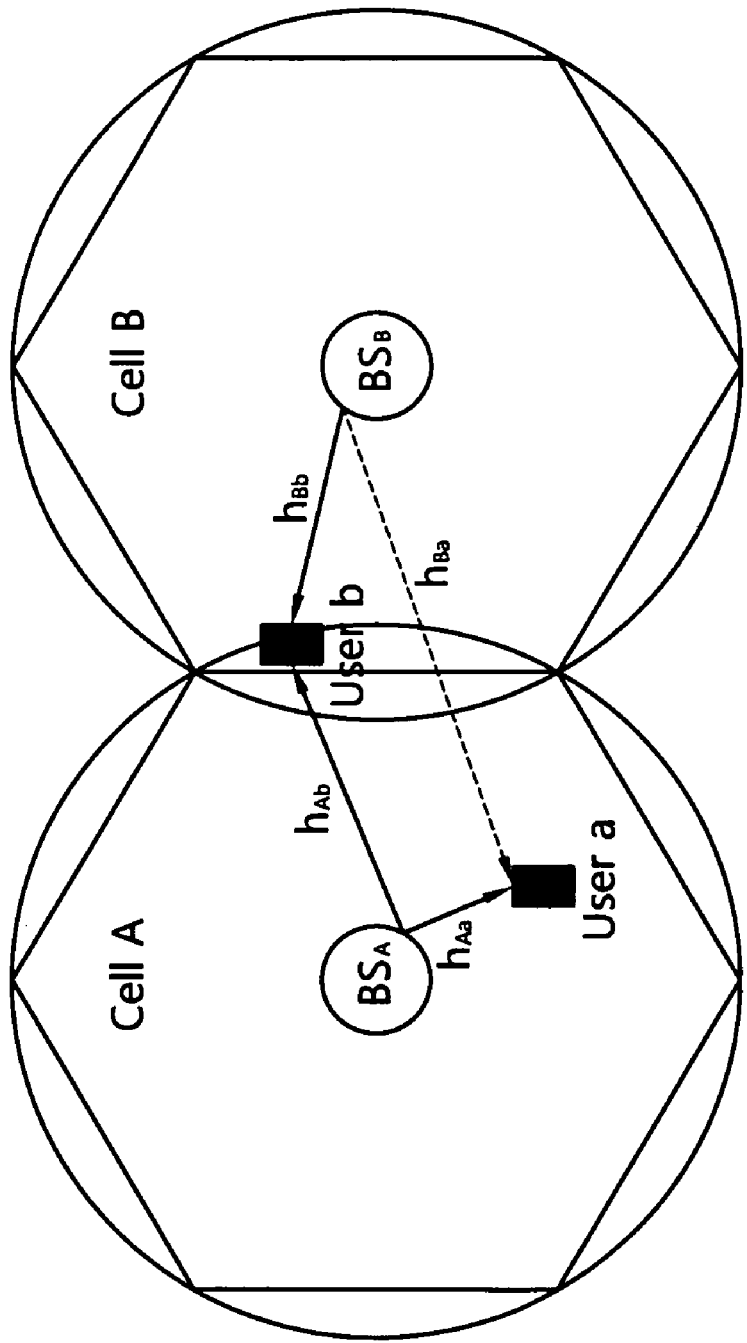
FIG. 2 is a schematic diagram showing two adjacent cells in accordance with one embodiment of the present invention.

FIG. 2 is a schematic diagram showing two neighboring cells in accordance with one embodiment of the present invention.

Referring to FIG. 2, user equipment-a is located at the center of cell-A, and user equipment-b is located at the boundary of cell-B. Base station-A is the base station of cell-A, and base station-B is the base station of cell-B. From the point of view of user equipment-a, cell-A is the serving cell and cell-B is the neighboring cell. From the point of view of user equipment-b, cell-B is the serving cell and cell-A is the neighboring cell. Since user equipment-b is located at the boundary of cell-B, it may receive strong interference from cell-A. Since user equipment-a is located at the center of cell-A, it may receive relatively weak interference from cell-B. User equipment-a and user equipment-b use the same time and frequency band and receive downlink data while causing interference to each other. Cell-A and cell-B may share scheduling information on time and frequency resources. Assuming that cell-A is a cell that strives to mitigate downlink interference affecting user equipment-b. A channel between base station-A and user equipment-a is represented by $h_{Aa}$, a channel between base station-A and user equipment-b is represented by $h_{Ab}$, a channel between base station-B and user equipment-a is represented by $h_{Ba}$, and a channel between base station-B and user equipment-b is represented by $h_{Bb}$.

Hereinafter, the description will be made based on two neighboring cells shown in FIG. 2 for convenience of description. However, the present invention is not limited thereto, and a plurality of neighboring cells may be placed in one serving cell.

Figure 3:
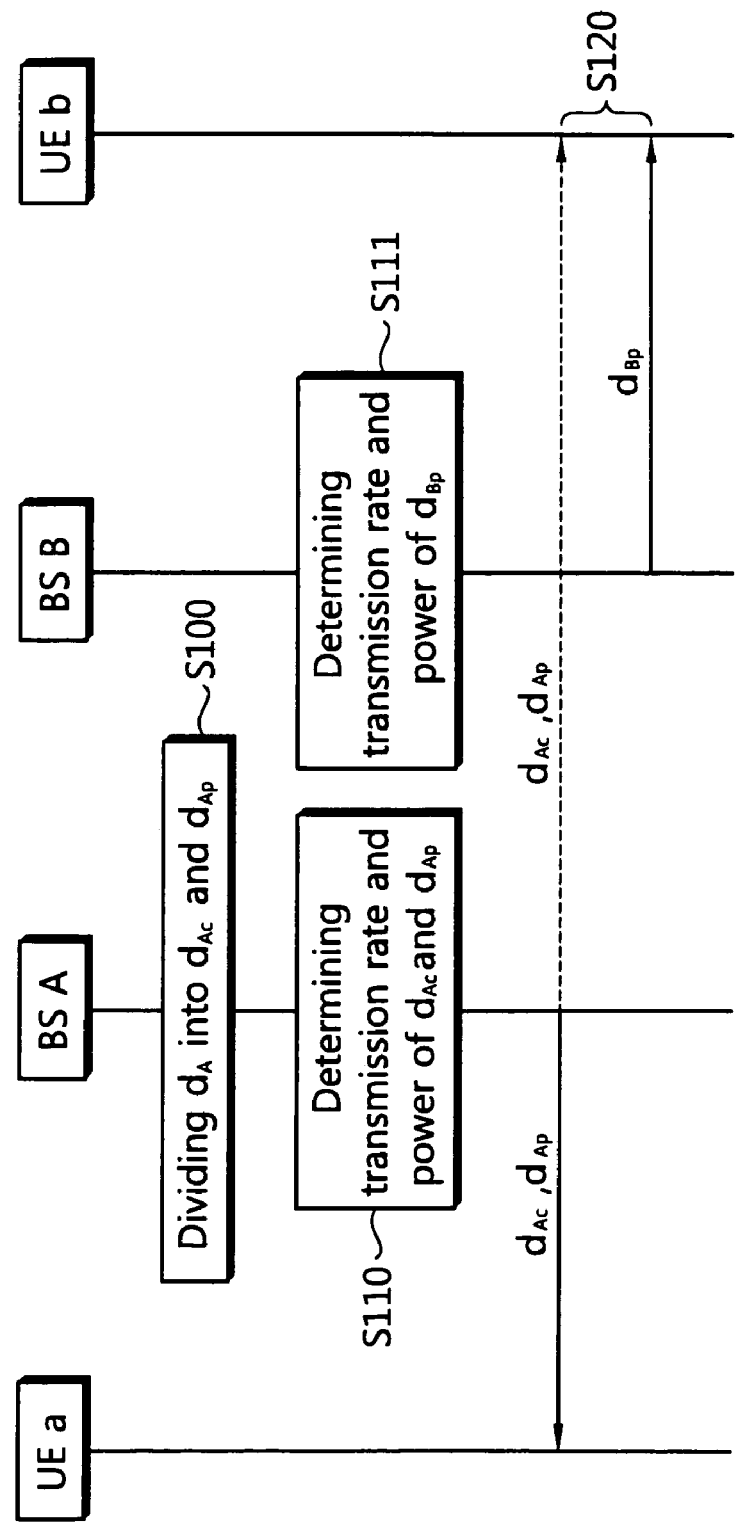
FIG. 3 is a flowchart showing a method of transmitting data in accordance with one embodiment of the present invention.

FIG. 3 is a flowchart showing a method of transmitting data in accordance with one embodiment of the present invention. It is assumed that the base station that transmits downlink data has a single antenna. The description will be given based on the configuration of cells and user equipments shown in FIG. 2 for convenience of description.

Referring to FIG. 3, base station-A divides downlink data $d_A$ into common data $d_{Ac}$ and private data $d_{Ap}$ (S100). The downlink data $d_A$ is one to be transmitted from base station-A to user equipment-a. The common data $d_{Ac}$ is defined as data that can be restored by the user equipment of the serving cell and the user equipment of the neighboring cell. Moreover, the private data $d_{Ap}$ is defined as data that can be restored by the user equipment of the serving cell, but cannot be restored by the user equipment of the neighboring cell. The common data $d_{Ac}$ can be restored by both of user equipment-a of the serving cell (cell-A) and user equipment-b of the neighboring cell (cell-B). The private data $d_{Ap}$ can be restored by user equipment-a, but cannot be restored by user equipment-b. However, the entire downlink data $d_B$ of base station-B can be restored by user equipment-b, but may be private data $d_{Bp}$ that cannot be restored by user equipment-a.

Base station-A determines the transmission rate and transmission power of the common data $d_{Ac}$ and the private data $d_{Ap}$ for user equipment-a (S110). Moreover, base station-B determines the transmission rate and transmission power of the private data $d_{Bp}$ for user equipment-b (S111). The transmission rate of the common data $d_{Ac}$ and that of the private data $d_{Ap}$ of base station-A may be different from each other. That is, the transmission rate $R_{Ac}$ of the common data $d_{Ac}$ is set to a level at which the common data $d_{Ac}$ can be restored by user equipment-b as well as by user equipment-a. In this case, the total transmission rate of base station-A for user equipment-a is $R_{Ac}+R_{Ap}$ which is the sum of the transmission rate of the common data $d_{Ac}$ and that of the private data $d_{Ap}$. The transmission rate of the private data $d_{Bp}$ of base station-B for user equipment-b may be represented by $R_{Bp}$.

Base station-A may allocate the transmission power $P_A$ to the common data $d_{Ac}$ and the private data $d_{Ap}$ at different levels. That is, the transmission power $P_A$ that base station-A uses to transmit the downlink data $d_A$ may be divided into a transmission power $\alpha P_A$ for the common data $d_{Ac}$ and a transmission power $(1-\alpha) P_A$ for the private data $d_{Ap}$. The transmission power of the private data or that of the common data for user equipment-a should be set to a level that can ensure a predetermined service quality required by user equipment-b. That is, from the point of view of user equipment-b, the transmission rate that base station-B can provide to user equipment-b should be above a predetermined level in a state where the interference from base station-A has been eliminated. For example, the private data $d_{Ap}$ that cannot be restored by user equipment-b causes interference to user equipment-b. If the transmission rate of the private data $d_{Ap}$ is set to very high, user equipment-b is significantly affected by interference and noise, and thereby the Signal to Interference and Noise Ratio (SINR) is reduced. Therefore, the service quality required by user equipment-b cannot be satisfied.

Base station-A transmits the common data $d_{Ac}$ and the private data $d_{Ap}$ for user equipment-a in the downlink, and base station-B transmits the private data $d_{Bp}$ for user equipment-b in the downlink using radio resources shared by base station-A (S120). Base station-A transmits the common data $d_{Ac}$ and the private data $d_{Ap}$ at the transmission rate and transmission power determined at step S110. Base station-B transmits the private data $d_{Bp}$ at the transmission rate and transmission power determined at step S111. Base station-A transmits the common data $d_{Ac}$ and the private data $d_{Ap}$ to user equipment-a. Base station-B transmits the private data $d_{Bp}$ to user equipment-b. However, since user equipment-b is located at the boundary between cell-A and cell-B, the common data $d_{Ac}$ and the private data $d_{Ap}$ of base station-A may cause interference to user equipment-b.

Next, a method of determining a data transmission rate by base station-A and base station-B will be described.

First, an example of determining a transmission rate $R_{Ac}$ of the common data $d_{Ac}$ by base station-A will be described. In a state where there is no interference mitigation, the SINR of the common data $d_{Ac}$ that affects user equipment-a may be represented by the following Formula 1, and the SINR of the common data $d_{Ac}$ that affects user equipment-b may be represented by the following Formula 2:

$$SINR_{Ac,a} = \frac{|v_{Ac,a} \cdot h_{Aa}|^2 \alpha p_A}{\|v_{Ac,a}\|^2 N_a + |v_{Ac,a} \cdot h_{Aa}|^2 (1-\alpha) p_A + |v_{Ac,a} \cdot h_{Ba}|^2 p_B} \quad \text{[Formula 1]}$$

$$SINR_{Ac,b} = \frac{|v_{Ac,b} \cdot h_{Ab}|^2 \alpha p_A}{\|v_{Ac,b}\|^2 N_b + |v_{Ac,b} \cdot h_{Ab}|^2 (1-\alpha) p_A + |v_{Ac,b} \cdot h_{Bb}|^2 p_B} \quad \text{[Formula 2]}$$

In the above formulas, $\alpha$ represents the power allocation coefficient between the common data $d_{Ac}$ and the private data $d_{Ap}$ of base station-A, v represents the receiver beamforming vector, $h_{Aa}$, $h_{Ab}$, $h_{Ba}$, and $h_{Bb}$ represent the channels between the base stations and the user equipments, and $N_a$ and $N_b$ represent the interference and noise that affect equipment-a and user equipment-b.

In the case where the SINR is given, the maximum transmission rate that can restore a signal without errors is defined as R(SINR). It is assumed that, if the data transmission rate is lower than R(SINR), the data can be restored without errors. The transmission rate $R_{Ac}$ of the common data $d_{Ac}$ of base station-A should be set to a level at which the common data $d_{Ac}$ can be restored by user equipment-a and user equipment-b without errors. That is, the transmission rate $R_{Ac}$ of the common data $d_{Ac}$ of base station-A may be represented by the following Formula 3:

$$R_{Ac}=\min(R(SINR_{Ac,a}),R(SINR_{Ac,b})) \quad \text{[Formula 3]}$$

As shown in Formula 3, the transmission rate $R_{Ac}$ of the common data $d_{Ac}$ of base station-A is set to a small value between $R(SINR_{Ac,a})$ and $R(SINR_{Ac,b})$.

The following is an example of the transmission rate of the private data $d_{Ap}$ of base station-A and that of the private data $d_{Bp}$ of base station-B. The following Formula 4 represents the transmission rate $R_{Ap}$ of the private data $d_{Ap}$ of base station-A, and the following Formula 5 represents the transmission rate $R_{Bp}$ of the private data $d_{Bp}$ of base station-B.

$$R_{Ap} = R(SINR_{Ap}),$$ [Formula 4]

$$SINR_{Ap} = \frac{|v_{Aa} \cdot h_{Aa}|^2 (1-\alpha) p_A}{\|v_{Aa}\|^2 N_a + |v_{Aa} \cdot h_{Ba}|^2 p_B}$$

$$R_{Bp} = R(SINR_{Bp}),$$ [Formula 5]

$$SINR_{Bp} = \frac{|v_{Bp} \cdot h_{Bb}|^2 p_B}{\|v_{Bp}\|^2 N_b + |v_{Bp} \cdot h_{Ab}|^2 (1-\alpha) p_A}$$

Base station-A and base station-B determine the transmission rates as shown in Formulas 4 and 5 such that user equipment-a and user equipment-b can restore the private data $d_{Ap}$ and $d_{Bp}$, respectively, in a state where the interference by the common data $d_{Ac}$ of base station-A is eliminated.

Figure 4:
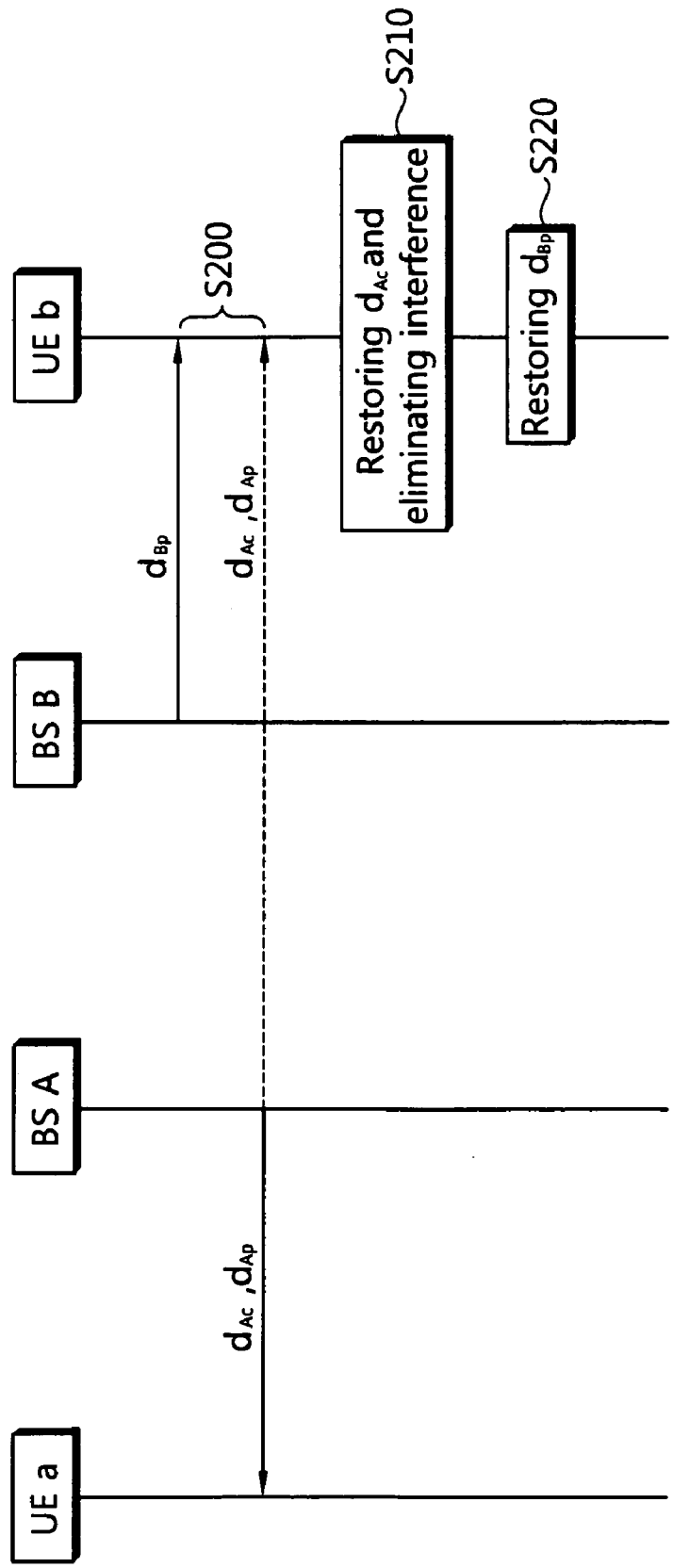
FIG. 4 is a flowchart showing a method of processing data in accordance with one embodiment of the present invention.

FIG. 4 is a flowchart showing a method of processing data in accordance with one embodiment of the present invention. The base station that transmits downlink data has a single antenna. The description will be given based on the configuration of cells and user equipments shown in FIG. 2 for convenience of description. However, the positions of the user equipments are not limited thereto. It is assumed that each of user equipment-a and user equipment-b has a receiver such as a successive interference cancellation (SIC) receiver or a maximum likelihood (ML) receiver. Therefore, if the user equipment could receive at least two data and restore one of the data without errors, it is possible to eliminate the interference that the corresponding data causes to the other data. Cell-A and cell-B may share scheduling information on time and frequency resources.

Referring to FIG. 4, user equipment-b receives downlink data $d_{Bp}$, that is the same as $d_B$ in this case, from base station-B and receives private data $d_{Ap}$ and common data $d_{Ac}$ from base station-A (S200). The private data $d_{Ap}$ and the common data $d_{Ac}$ of base station-A for user equipment-a are not the data to be transmitted to user equipment-b. However, since user equipment-b is located near base station-A, the private data $d_{Ap}$ and the common data $d_{Ac}$ transmitted from base station-A may be received by user equipment-b. The private data $d_{Ap}$ and the common data $d_{Ac}$ that base station-A transmits may include different reference signals. The entire downlink data $d_B$ of base station-B for user equipment-b can be restored by user equipment-b, but may be private data $d_{Bp}$ that cannot be restored by user equipment-a. The transmission rate and transmission power of the private data $d_{Bp}$ of base station-B are the same as described above. The common data $d_{Ac}$ of base station-A may be a part of the downlink data $d_A$ for user equipment-a, which can be restored by user equipment-b as well as by user equipment-a. The private data $d_{Ap}$ of base station-A may be a part of the downlink data $d_A$ for user equipment-a, which can be restored by user equipment-a, but cannot be restored by user equipment-b. The transmission rate and transmission power of the common data $d_{Ac}$ of base station-A are the same as described above.

User equipment-b restores the common data $d_{Ac}$ and eliminates the interference (S210). Since the common data $d_{Ac}$ belongs to base station-A, it acts as an interference to user equipment-b. Therefore, user equipment-b restores the common data $d_{Ac}$, eliminates the interference, and then abandons the common data $d_{Ac}$. Here, whether user equipment-b can restore the common data $d_{Ac}$ is determined by the transmission rate $R_{Ac}$ of the common data $d_{Ac}$. Accordingly, the transmission rate $R_{Ac}$ of the common data $d_{Ac}$ may be set to a small value between the transmission rate $R(SINR_{Ac,a})$ at SINR ($SINR_{Ac,a}$) of the common data $d_{Ac}$ that affects user equipment-a and the transmission rate $R(SINR_{Ac,b})$ at SINR($SINR_{Ac,b}$) of the common data $d_{Ac}$ that affects user equipment-b.

If there is a plurality of cells adjacent to cell-B and user equipment-b may receives a plurality of common data $d_{Ac}$, user equipment-b may sequentially perform restoration and interference mitigation for individual common data $d_{Ac}$. In addition, user equipment-a restores the common data $d_{Ac}$ and perform an appropriate process as it recognizes that the common data $d_{Ac}$ is transmitted to itself. User equipment-b may abandon the common data $d_{Ac}$ after step S210. However, if user equipment-b determines that the common data $d_{Ac}$ is useful, it may use the common data $d_{Ac}$.

After user equipment-b eliminates the interference by base station-A, it restores the private data $d_{Bp}$, which is the downlink data from base station-B to itself (S220). The transmission rate $R_{Bp}$ for the private data $d_{Bp}$ of base station-B can be determined using Formula 5. User equipment-a restores the private data $d_{Ap}$ of base station-A.

Therefore, from the point of view of user equipment-b, it is possible to achieve an effect that reduces the interference that base station-A causes to user equipment-b as if eliminating the transmission power of $\alpha P_A$ and then transmitting the downlink data. Moreover, from the point of view of base station-A, it is possible to maximize the transmission power $P_A$ and the transmission rate $R_{Ac}+R_{Ap}$ while minimizing the interference to user equipment-b.

Figure 5:
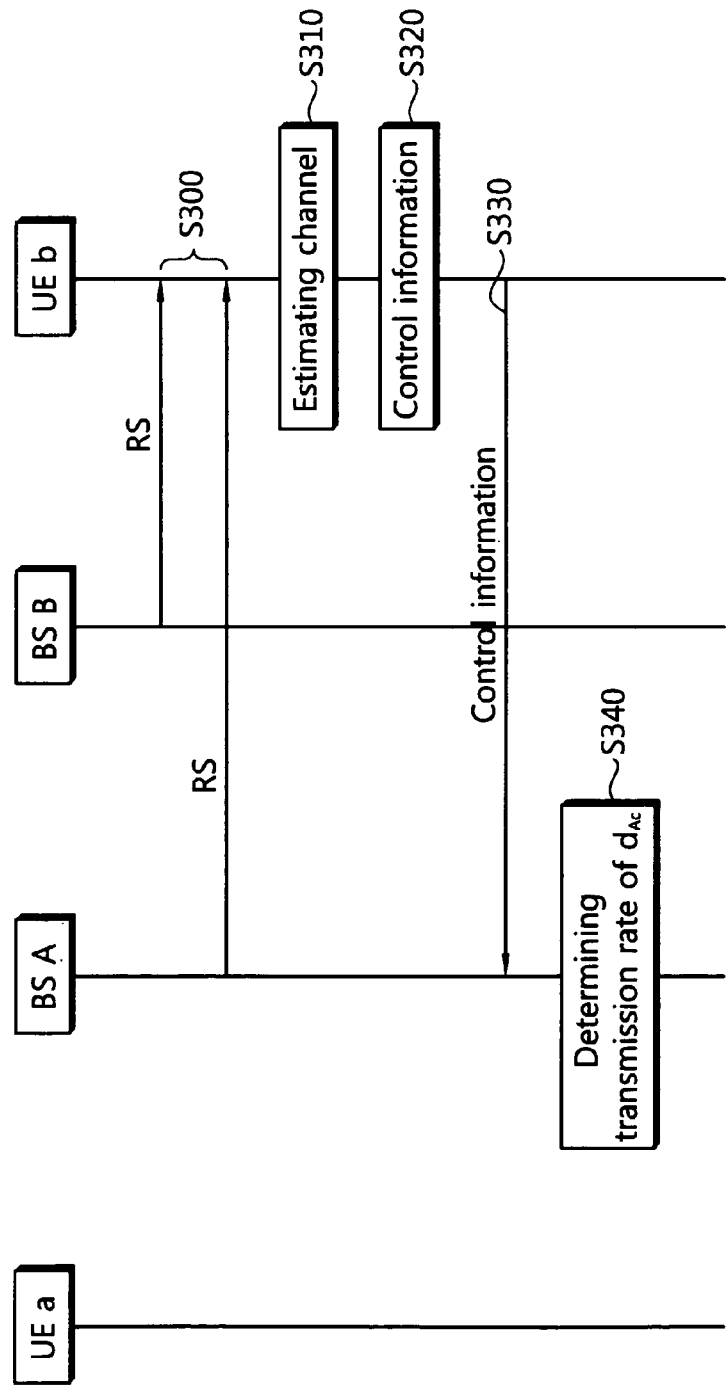
FIG. 5 is a flowchart of a control signal in accordance with one embodiment of the present invention.

FIG. 5 is a flowchart of a control signal in accordance with one embodiment of the present invention. When transmitting data in the downlink, the base station requires control information in order to determine the data transmission rate and transmission power. It is assumed that the transmission rate of the private data $d_{Bp}$ of base station-B should be above a predetermined value.

Referring to FIG. 5, user equipment-b receives reference signals RS from base station-A and base station-B (S300). For example, the reference signals may be pilot signals or sounding reference signals SRS.

User equipment-b estimates a channel using received signals (S310). For example, an estimated channel value between base station-A and user equipment-b may be $$\frac{\sqrt{p_A}}{\sqrt{N_b}} h_{aB}$$

and an estimated channel value between base station-B and user equipment-b may be $$\frac{\sqrt{p_A}}{\sqrt{N_b}} h_{bB}.$$

Here, $p_A$ represents the transmission power allocated so that base station-A transmits downlink data to user equipment-a, $p_a$ represents the transmission power allocated so that base station-B transmits downlink data to user equipment-b, $h_{Ab}$ represents the channel between base station-A and user equipment-b, $h_{Bb}$ represents the channel between base station-B and user equipment-b, and $N_b$ represents the interference and noise that affect user equipment-b.

User equipment-b obtains control information using the estimated channel values (S320). The control information includes information that the base station requires to determine the data transmission rate and transmission power. For example, the control information may include α representing the power allocation coefficient between the common data $d_{Ac}$ and the private data $d_{Ap}$ of base station-A and $SINR_{Ac,b}$ representing the SINR of the common data $d_{Ac}$ of base station-A that affects user equipment-b. Meanwhile, a may be determined using Formula 5 and $SINR_{Ac,b}$ may be determined using Formula 2 so as to ensure the minimum transmission rate for the private data $d_{Bp}$ of base station-B. Besides, the control information may include a Modulation and Coding Scheme (MCS) level required for the common data $d_{Ac}$, a transmission rate of the common data $d_{Ac}$ of base station-A, which can be restored by user equipment-b, and a transmission power of the common data $d_{Ac}$ or the private data $d_{Ap}$ of base station-A, which is set to a level that can ensure the service quality required by user equipment-b. In this case, the service quality required by user equipment-b means that the transmission rate of the private data $d_{Bp}$ of base station-B is above a predetermined value in a state where the interference by the common data $d_{Ac}$ of base station-A is eliminated.

User equipment-b transmits the control information to base station-A (S330). User equipment-b may transmit the control information directly to base station-A over a wireless link. Otherwise, user equipment-b may transmit the control information to base station-A via base station-B over a wired link.

Base station-A determines the transmission rate $R_{Ac}$ of the common data $d_{Ac}$ of base station-A using the control information (S340). That is, base station-A may determine the transmission rate $R(SINR_{Ac,b})$ using $SINR_{Ac,b}$ and may determine a small value between $R(SINR_{Ac,a})$ and $R(SINR_{Ac,b})$ as the transmission rate $R_{Ac}$ of the common data $d_{Ac}$ such that user equipment-a and user equipment-b can restore the common data $d_{Ac}$ of base station-A.

Base station-A transmits the common data $d_{Ac}$ at the transmission rate determined at step S340 to user equipment-a. For convenience of description, a process in which base station-A transmits the private data $d_{Ap}$ to user equipment-a and a process in which base station-B transmits the private data $d_{Bp}$ to user equipment-b are omitted in FIG. 5.

Next, the embodiment of the present invention which has been described above with reference to FIGS. 3 to 5 will be described with reference to the case where the base station has a multi-antenna. If the base station has at least two transmitting antennas, it is possible to achieve spatial multiplexing gain. That is, the base station can divide one downlink data into a plurality of data and transmit them.

Figure 6:
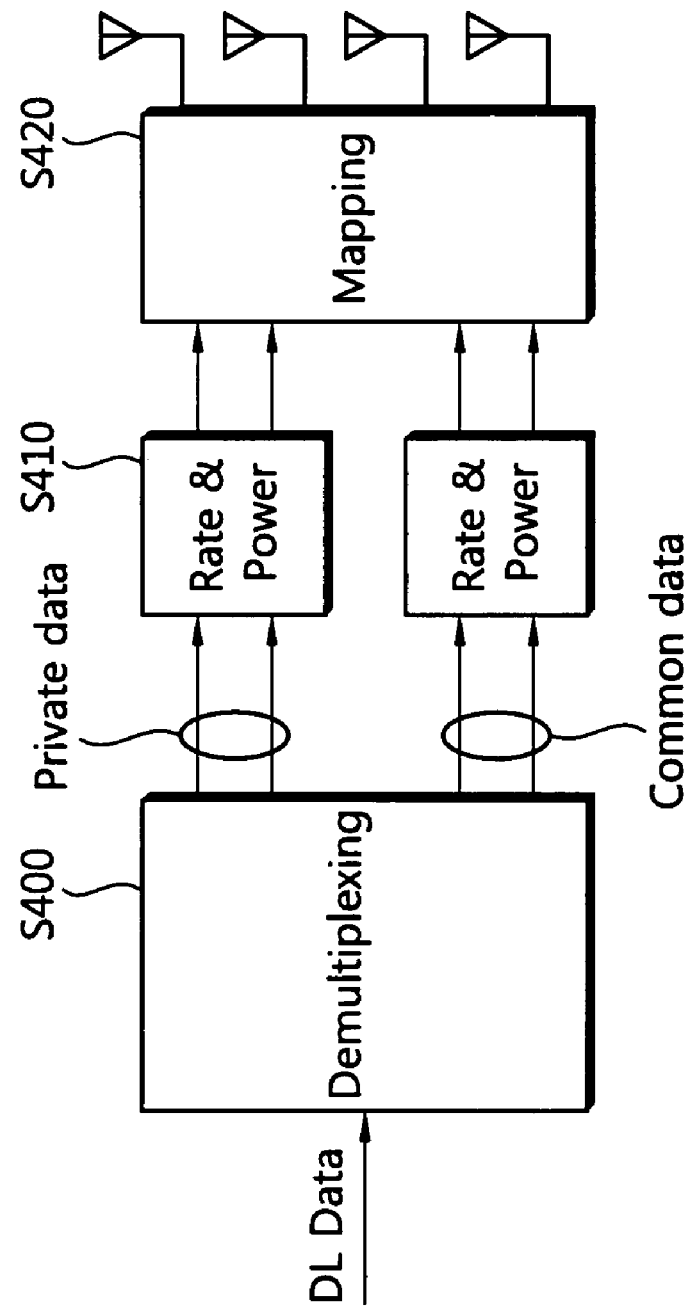
FIG. 6 is a schematic diagram showing the operation of a base station having a multi-antenna in accordance with one embodiment of the present invention.

FIG. 6 is a schematic diagram showing the operation of a base station having a multi-antenna in accordance with one embodiment of the present invention.

Referring to FIG. 6, the base station divides downlink data into a plurality of data using a demultiplexer (S400). A portion of the plurality of data may be set to common data and another portion may be set to private data. The common data and the private data may comprise a plurality of data streams, respectively. The common data can be restored by the user equipment of the neighboring cell as well as the user equipment of the serving cell. The private data can be restored by the user equipment of the serving cell, but cannot be restored by the user equipment of the neighboring cell.

The base station determines the transmission rate and transmission power of the common data and the private data, respectively (S410). The transmission rate of the common data is set to a level at which the common data can be restored by the user equipment of the neighboring cell as well as by the user equipment of the serving cell. The transmission power of the common data and the private data is set to a level that can satisfy the service quality required by both the user equipment of the serving cell and the user equipment of the neighboring cell. The transmission rate and transmission power can be readily determined by those skilled in the art by the method illustrated in the base station having a single antenna. That is, the transmission rate and transmission power may be determined with reference to Formulas 1 to 5.

The base station maps the common data and the private data to a plurality of transmitting antennas and transmits them to the user equipment (S420). For example, the common data is mapped to a portion of the plurality of transmitting antennas of the base station and the private data is mapped to another portion such that the common data and the private data can be mapped to the other portion, while superpositioning each other, and transmitted.

The method of processing data in a multi-antenna system is similar to the methods of transmitting and processing data in the single antenna system shown in FIGS. 3 to 5. That is, the user equipment restores the common data received from the base station of the neighboring cell, eliminates the interference, and then restores the private data received from the base station of the serving cell. However, in the multi-antenna system, the user equipment may receive a plurality of common data. In this case, the user equipment may sequentially restore the plurality of common data and eliminate the interference one by one.

As above, although the description has been given to the example in which two neighboring cells cooperate with each other, the present invention is not limited thereto. In the case where at least two cells participate in the cooperation, each of the cells takes an operation between the operations of cell-A and cell-B shown in FIG. 2. That is, cell-A determines the transmission rate and transmission power such that all the user equipments in all neighboring cells (cell-B) that participate in the cooperation can restore the common data $d_{Ac}$ transmitted by cell-A. Moreover, user equipment-b located at the boundary of cell-B restores the common data $d_{Ac}$ received from the plurality of neighboring cells (cell-A) that participate in the cooperation, eliminates the interference, and then restore the private data $d_{Bp}$. If necessary, user equipment-b may sequentially restore the plurality of common data $d_{Ac}$ received from the plurality of cells (cell-A) and eliminate the interference one by one.

II. Uplink Data Transmission

Figure 7:
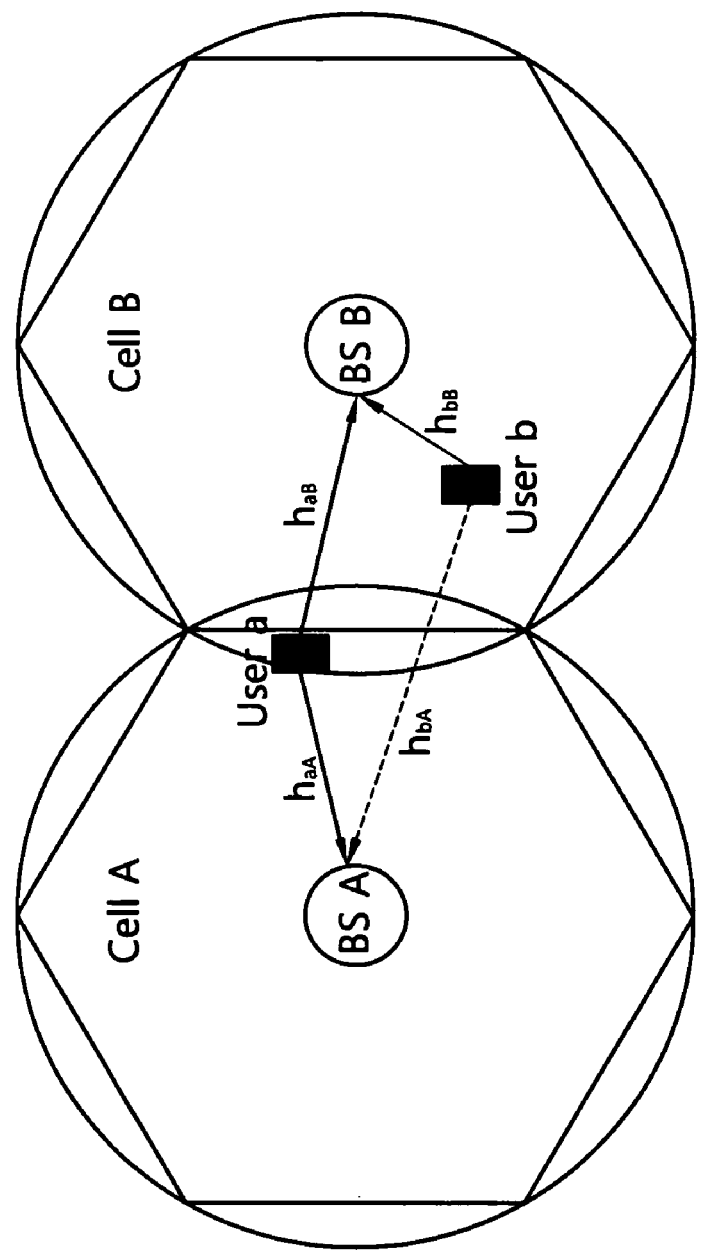
FIG. 7 is a schematic diagram showing two adjacent cells in accordance with another embodiment of the present invention.

FIG. 7 is a schematic diagram showing two neighboring cells in accordance with another embodiment of the present invention.

Referring to FIG. 7, user equipment-a is located at the boundary of cell-A, and user equipment-b is located at the center of cell-B. Base station-A is the base station of cell-A, and base station-B is the base station of cell-B. From the point of view of user equipment-a, cell-A is the serving cell and cell-B is the neighboring cell. From the point of view of user equipment-b, cell-B is the serving cell and cell-A is the neighboring cell. Since user equipment-a is located at the boundary of cell-A, it may give strong interference to cell-B. Since user equipment-b is located at the center of cell-B, it may give relatively weak interference to cell-A. Cell-A and cell-B use the same time and frequency band and receive uplink data while causing interference to each other. Cell-A and cell-B may share scheduling information on time and frequency resources. For example, the base station-A may inform the base station-B of scheduling information for the user equipment-a. Assuming that user equipment-a is a user equipment that strives to mitigate uplink interference affecting cell-B. A channel between user equipment-a and base station-A is represented by $h_{a,A}$, a channel between user equipment-a and base station-B is represented by $h_{aB}$, a channel between user equipment-b and base station-A is represented by $h_{b,A}$, and a channel between user equipment-b and base station-B is represented by $h_{bB}$.

Hereinafter, the description will be made based on two neighboring cells shown in FIG. 7 for convenience of description. However, the present invention is not limited thereto, and a plurality of neighboring cells may be placed in one serving cell. Also, we can consider the case where user equipment-a is located at the center of cell-A and user equipment-b is located at the boundary of cell-B.

Figure 8:
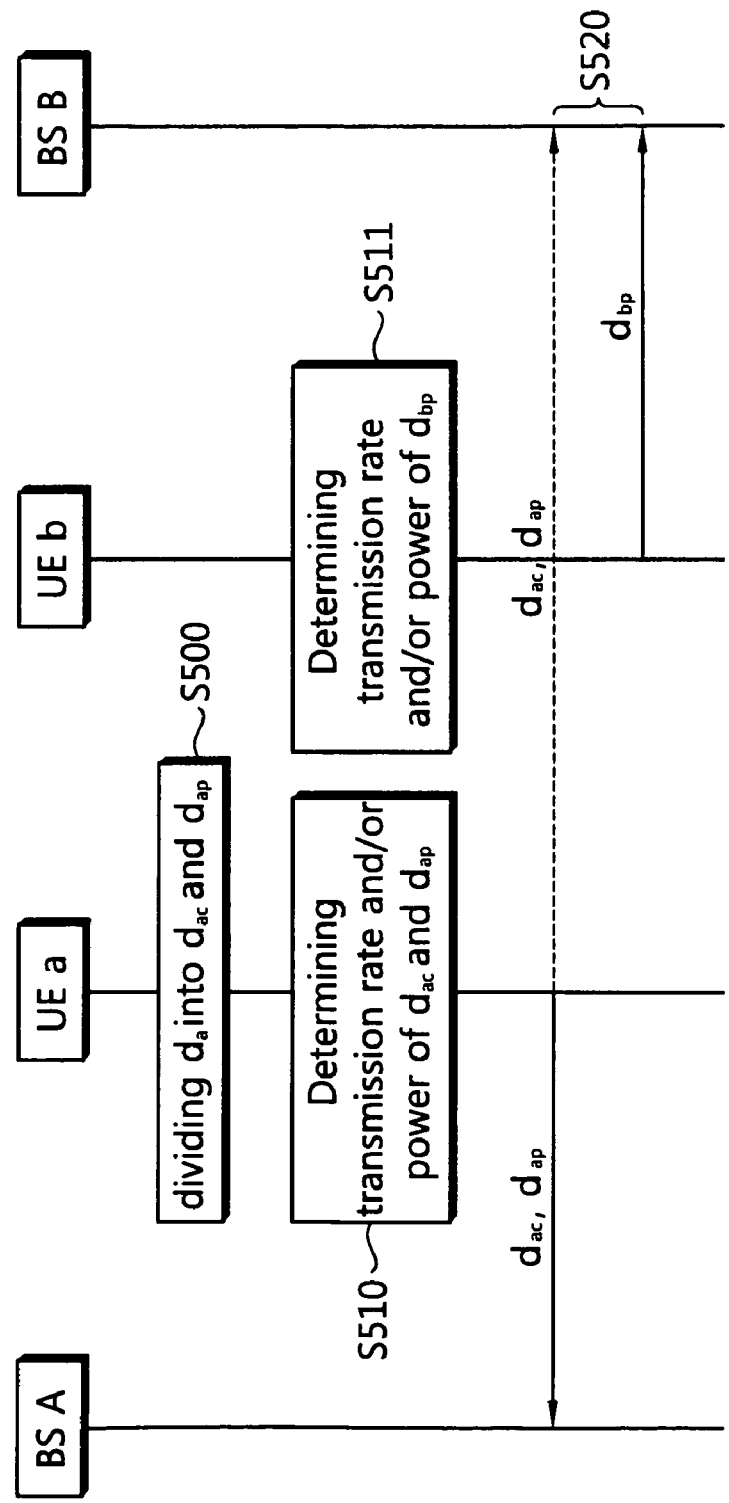
FIG. 8 is a flowchart showing a method of transmitting data in accordance with another embodiment of the present invention.

FIG. 8 is a flowchart showing a method of transmitting data in accordance with another embodiment of the present invention. It is assumed that the user equipment that transmits uplink data has a single antenna. The description will be given based on the configuration of cells and user equipments shown in FIG. 7 for convenience of description. However, the position of the user equipment in each cell is not limited thereto. Cell-A and cell-B may share scheduling information on time and frequency resources.

Referring to FIG. 8, user equipment-a divides uplink data ($d_a$) into common data $d_{ac}$ and private data $d_{ap}$ (S500). The uplink data $d_a$ is one to be transmitted from user equipment-a to base station-A. The common data $d_{ac}$ is defined as data that can be restored by the serving cell (cell-A) and the neighboring cell (cell-B) of the user equipment-a. Moreover, the private data $d_{ap}$ is defined as data that can be restored by cell-A, but cannot be restored by the cell-B. However, the entire uplink data $d_b$ of user equipment-b may be private data $d_{bp}$ that can be restored by cell-B, but cannot be restored by cell-A.

User equipment-a determines the transmission rate and transmission power of the common data $d_{ac}$ and the private data $d_{ap}$ (S510). Moreover, user equipment-b determines the transmission rate and transmission power of the private data $d_{bp}$ (S511). The transmission rate of the common data $d_{ac}$ and that of the private data $d_{ap}$ of user equipment-a may be different from each other. That is, the transmission rate $R_{ac}$ of the common data $d_{ac}$ is set to a level at which the common data $d_{ac}$ can be restored by cell-B as well as by cell-A. In this case, the total transmission rate of user equipment-a is $R_{ac}+R_{ap}$ which is the sum of the transmission rate of the common data $d_{ac}$ and that of the private data $d_{ap}$. The transmission rate of the private data $d_{bp}$ of user equipment-b may be represented by $R_{bp}$.

The transmission power of the common data $d_{ac}$ and that of the private data $d_{ap}$ of user equipment-a may be different from each other. That is, the transmission power $P_a$ that user equipment-a uses to transmit the uplink data $d_a$ may be divided into a transmission power $\alpha P_a$ for the common data $d_{ac}$ and a transmission power $(1-\alpha) P_a$ for the private data $d_{ap}$. The transmission power of the private data or that of the common data should be set to a level that can ensure a predetermined service quality required by the neighboring cell (cell-B). That is, from the point of view of cell-B, the transmission rate that user equipment-b can provide to base station-B should be above a predetermined level in a state where the interference from user equipment-a has been eliminated. For example, the private data $d_{ap}$ causes interference to cell-B. If the transmission rate of the private data $d_{ap}$ is set to very high, cell-B is significantly affected by interference and noise, and thereby the Signal to Interference and Noise Ratio (SINR) is reduced. Therefore, the service quality required by cell-B cannot be satisfied.

User equipment-a transmits the common data $d_{ac}$ and the private data $d_{ap}$ to the base station-A, and user equipment-b transmits the private data $d_{bp}$ to the base station-B using radio resources shared by base station-A (S520). User equipment-a transmits the common data $d_{ac}$ and the private data $d_{ap}$ at the transmission rate and transmission power determined at step S510. User equipment-b transmits the private data $d_{bp}$ at the transmission rate and transmission power determined at step S511. User equipment-a transmits the common data $d_{ac}$ and the private data $d_{ap}$ to base station-A. User equipment-b transmits the private data $d_{bp}$ to base station-B. However, since user equipment-a is located at the boundary between cell-A and cell-B, the common data $d_{ac}$ and the private data $d_{ap}$ of user equipment-a may cause interference to cell-B.

Next, a method of determining a data transmission rate by user equipment-a and user equipment-b will be described.

First, an example of determining a transmission rate $R_{ac}$ of the common data $d_{ac}$ by user equipment-a will be described. In a state where there is no interference mitigation, the SINR of the common data $d_{ac}$ that affects cell-A may be represented by the following Formula 6, and the SINR of the common data $d_{ac}$ that affects cell-B may be represented by the following Formula 7:

$$SINR_{ac,A} = \frac{|v_{ac,A} \cdot h_{aA}|^2 \alpha p_a}{\|v_{ac,A}\|^2 N_A + |v_{ac,A} \cdot h_{aA}|^2 (1-\alpha) p_a + |v_{ac,A} \cdot h_{bA}|^2 p_b} \quad \text{[Formula 6]}$$

$$SINR_{ac,B} = \frac{|v_{ac,B} \cdot h_{aB}|^2 \alpha p_a}{\|v_{ac,B}\|^2 N_B + |v_{ac,B} \cdot h_{aB}|^2 (1-\alpha) p_a + |v_{ac,B} \cdot h_{bB}|^2 p_b} \quad \text{[Formula 7]}$$

In the above formulas, $\alpha$ represents the power allocation coefficient between the common data $d_{ac}$ and the private data $d_{ap}$ of user equipment-a, $v$ represents the receiver beamforming vector, $h_{aA}$, $h_{aB}$, $h_{bA}$, and $h_{bB}$ represent the channels between the base stations and the user equipments, and $N_A$ and $N_B$ represent the interference and noise that affect cell-A and cell-B.

In the case where the SINR is given, the maximum transmission rate that can restore a signal without errors is defined as R(SINR). It is assumed that, if the data transmission rate is lower than R(SINR), the data can be restored without errors. The transmission rate $R_{ac}$ of the common data $d_{ac}$ should be set to a level at which the common data $d_{ac}$ can be restored by cell-A and cell-B without errors. That is, the transmission rate $R_{ac}$ of the common data $d_{ac}$ may be represented by the following Formula 8:

$$R_{ac} = \min(R(SINR_{ac,A}), R(SINR_{ac,B})) \quad \text{[Formula 8]}$$

As shown in Formula 8, the transmission rate $R_{ac}$ of the common data $d_{ac}$ of user equipment-a is set to a small value between $R(SINR_{ac,A})$ and $R(SINR_{ac,B})$.

The following is an example of the transmission rate of the private data $d_{ap}$ of user equipment-a and that of the private data $d_{bp}$ of user equipment-b The following Formula 9 represents the transmission rate $R_{ap}$ of the private data $d_{ap}$ of user equipment-a, and the following Formula 10 represents the transmission rate $R_{bp}$ of the private data $d_{bp}$ of user equipment-b.

$$R_{ap} = R(SINR_{ap}), \quad \text{[Formula 9]}$$
$$SINR_{ap} = \frac{|v_{ap,A} \cdot h_{aA}|^2 (1-\alpha) p_a}{\|v_{ap,A}\|^2 N_A + |v_{ap,A} \cdot h_{bA}|^2 p_b}$$

$$R_{bp} = R(SINR_{bp}), \quad \text{[Formula 10]}$$
$$SINR_{bp} = \frac{|v_{bp,B} \cdot h_{bB}|^2 p_b}{\|v_{bp,B}\|^2 N_B + |v_{bp,B} \cdot h_{aB}|^2 (1-\alpha) p_a}$$

User equipment-a and user equipment-b determine the transmission rates as shown in Formulas 9 and 10 such that the private data $d_{ap}$ and $d_{bp}$ can be restored in a state where the interference by the common data $d_{ac}$ of user equipment-a is eliminated.

Figure 9:
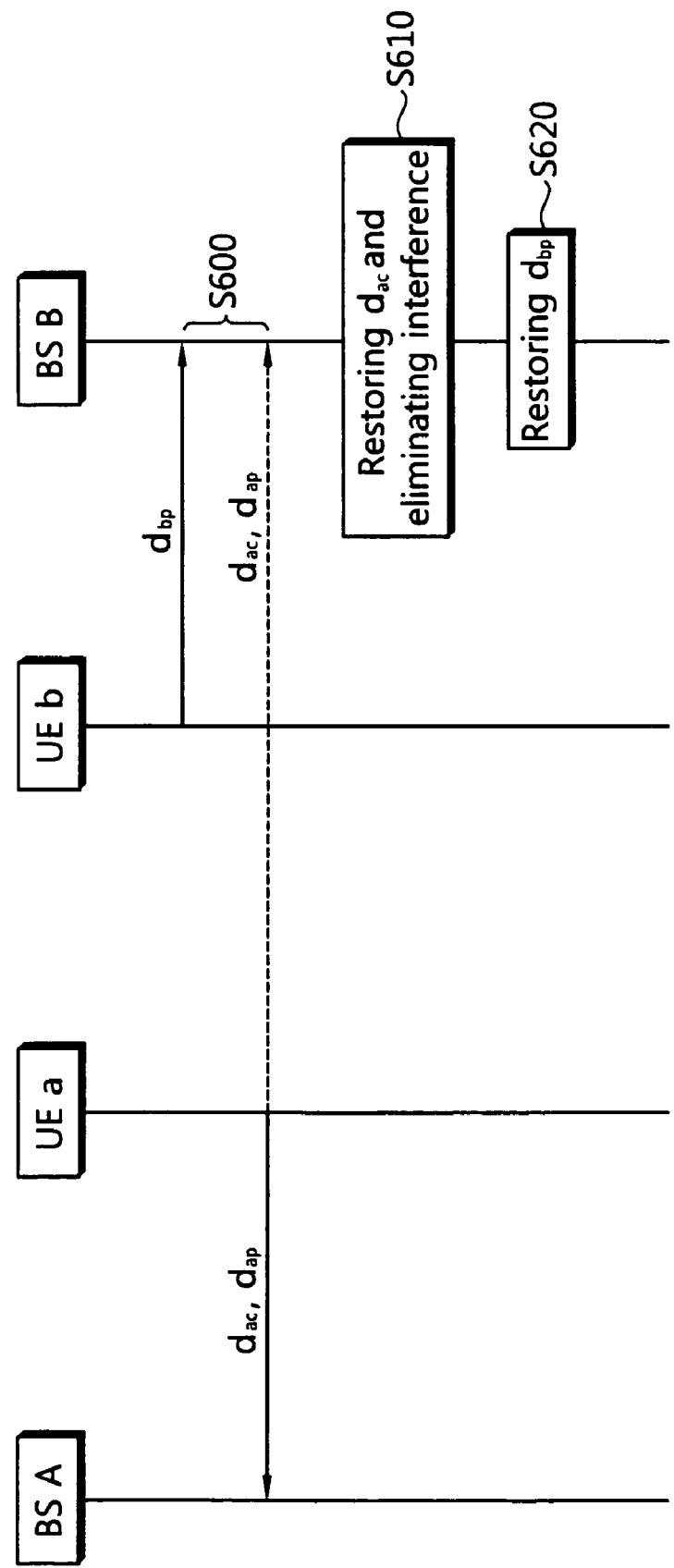
FIG. 9 is a flowchart showing a method of processing data in accordance with another embodiment of the present invention.

FIG. 9 is a flowchart showing a method of processing data in accordance with another embodiment of the present invention. The user equipment that transmits uplink data has a single antenna. The description will be given based on the configuration of cells and user equipments shown in FIG. 7 for convenience of description. However, the positions of the user equipments are not limited thereto. It is assumed that each of cell-A and cell-B has a receiver such as a successive interference cancellation (SIC) receiver or a maximum likelihood (ML) receiver. Cell-A and cell-B may share scheduling information on time and frequency resources.

Referring to FIG. 9, base station-B receives uplink data $d_b$ from user equipment-b and receives private data $d_{ap}$ and common data $d_{ac}$ from user equipment-a (S600). The private data $d_{ap}$ and the common data $d_{ac}$ of user equipment-a are not the data to be transmitted to base station-B. However, since user equipment-a is located near base station-B, the private data $d_{ap}$ and the common data $d_{ac}$ of user equipment-a may be received by base station-B. However, the private data $d_{ap}$ and the common data $d_{ac}$ of user equipment-a include different reference signals. The entire uplink data $d_b$ of user equipment-b may be private data $d_{bp}$ that can be restored by base station-B, but cannot be restored by base station-A. The transmission rate and transmission power of the private data $d_{bp}$ of user equipment-b are the same as described above. The common data $d_{ac}$ of user equipment-a is a part of the uplink data $d_a$ of user equipment-a, which can be restored by cell-B as well as by cell-A. The private data $d_{ap}$ of user equipment-a is a part of the uplink data $d_a$ of user equipment-a, which can be restored by cell-A, but cannot be restored by cell-B. The transmission rate and transmission power of the common data $d_{ac}$ of user equipment-a are the same as described above.

Base station-B restores the common data $d_{ac}$ and eliminates the interference (S610). Since the common data $d_{ac}$ is the data of user equipment-a which is located on cell-A, it acts as an interference to cell-B. Therefore, base station-B restores the common data $d_{ac}$, eliminates the interference, and then abandons the common data $d_{ac}$. However, if base station-B can use the common data, it does not abandon the common data. Here, whether base station-B can restore the common data $d_{ac}$ is determined by the transmission rate $R_{ac}$ of the common data $d_{ac}$. Accordingly, the transmission rate $R_{ac}$ of the common data $d_{ac}$ may be set to a small value between the transmission rate $R(SINR_{ac,A})$ at $SINR(SINR_{ac,A})$ of the common data $d_{ac}$ that affects cell-A and the transmission rate $R(SINR_{ac,B})$ at $SINR(SINR_{ac,B})$ of the common data $d_{ac}$ that affects cell-B. If there is a plurality of cells adjacent to cell-B and base station-B receives a plurality of common data $d_{ac}$, base station-B may sequentially perform restoration and interference mitigation for individual common data $d_{ac}$. In addition, base station-A restores the common data $d_{ac}$ and perform an appropriate process as it recognizes that the common data $d_{ac}$ is transmitted to itself.

After base station-B eliminates the interference by user equipment-a, it restores the private data $d_{bp}$, which is the uplink data of user equipment-b (S620). The transmission rate $R_{bp}$ for the private data $d_{bp}$ of user equipment-b can be determined using Formula 10. Base station-A restores the private data $d_{ap}$ of user equipment-a.

Therefore, from the point of view of cell-B, it is possible to achieve an effect that reduces the interference that user equipment-a causes to cell-B as if eliminating the transmission power of $\alpha P_a$ and then transmitting the uplink data. Moreover, from the point of view of cell-A, it is possible to maximize the transmission power $P_a$ and the transmission rate $R_{ac}+R_{ap}$, while minimizing the interference to cell-B.

Figure 10:
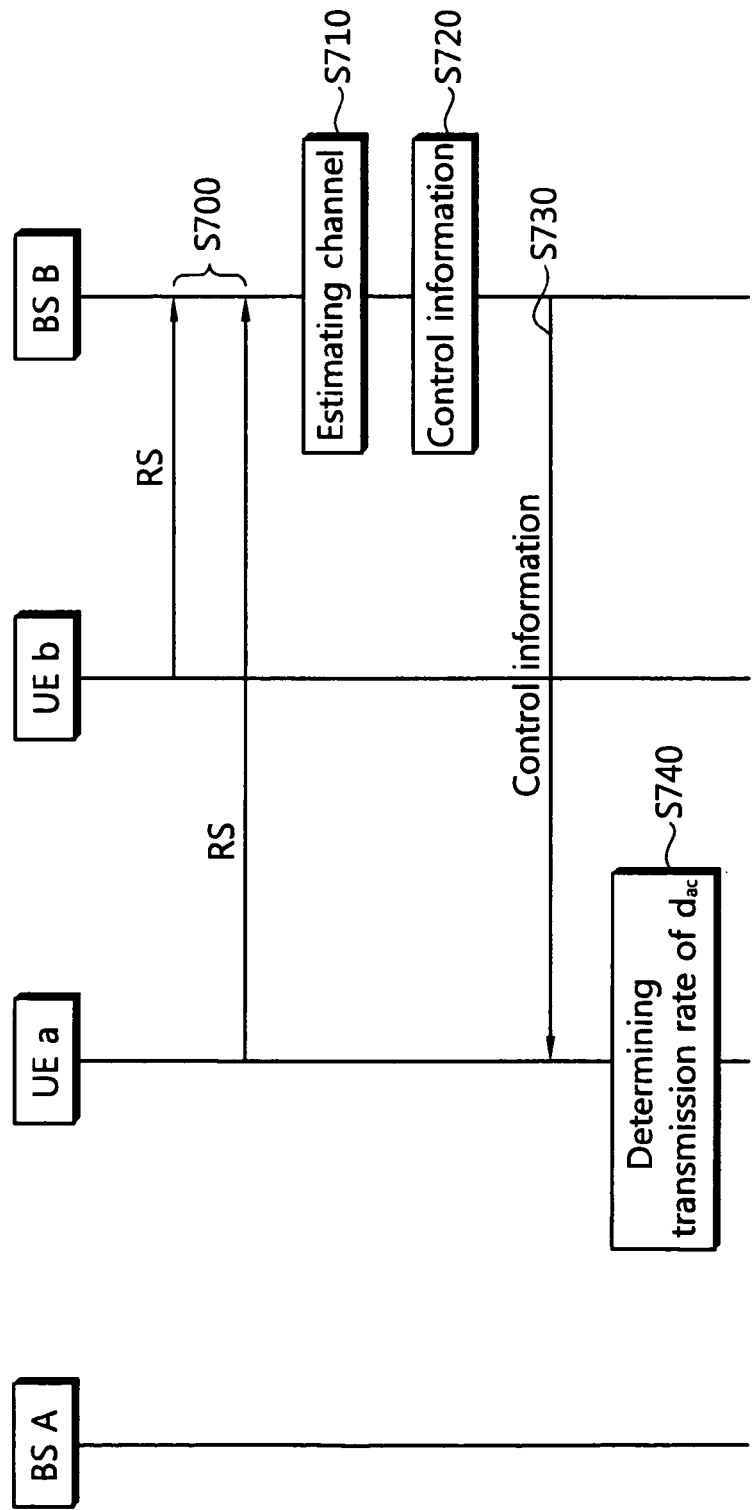
FIG. 10 is a flowchart of a control signal in accordance with another embodiment of the present invention.

FIG. 10 is a flowchart of a control signal in accordance with another embodiment of the present invention. The user equipment requires control information in order to determine the data transmission rate and transmission power. It is assumed that the transmission rate of the private data $d_{bp}$ of user equipment-b should be above a predetermined value.

Referring to FIG. 10, base station-B receives reference signals RS from user equipment-a and user equipment-b (S700). For example, the reference signals may be pilot signals or sounding reference signals SRS.

Base station-B estimates a channel using received signals (S710). For example, an estimated channel value between user equipment-a and base station-B may be $$\frac{\sqrt{p_a}}{\sqrt{N_B}} h_{aB}$$

and an estimated channel value between user equipment-a and base station-B may be $$\frac{\sqrt{p_b}}{\sqrt{N_B}} h_{bB}.$$

Here, $P_a$ represents the transmission power that is allocated to user equipment-a, $P_b$ represents the transmission power that is allocated to user equipment-b, $h_{aB}$ represents the channel between user equipment-a and base station-B, $h_{bB}$ represents the channel between user equipment-b and base station-B, and $N_B$ represents the interference and noise that affect cell-B.

Base station-B obtains control information using the estimated channel values (S720). The control information includes information that the user equipment requires to determine the data transmission rate and transmission power. For example, the control information may include $\alpha$ representing the power allocation coefficient between the common data $d_{ac}$ and the private data $d_{ap}$ of user equipment-a and $SINR_{ac,B}$ representing the SINR of the common data $d_{ac}$ of user equipment-a that affects cell-B. Meanwhile, $\alpha$ may be determined using Formula 10 and $SINR_{ac,B}$ may be determined using Formula 7 so as to ensure the minimum transmission rate for the private data $d_{bp}$ of user equipment-b which is located on cell-B. Besides, the control information may include a Modulation and Coding Scheme (MCS) level required for the common data $d_{ac}$, a transmission rate of the common data $d_{ac}$ of user equipment-a, which can be restored by cell-B, and a transmission power of the common data $d_{ac}$ of user equipment-a, which is set to a level that can ensure the service quality required by cell-B. In this case, the service quality required by cell-B means that the transmission rate of the private data $d_{bp}$ of user equipment-b is above a predetermined value in a state where the interference by the common data $d_{ac}$ of user equipment-a is eliminated.

Base station-B transmits the control information to user equipment-a (S730). Base station-B may transmit the control information directly to user equipment-a over a wireless link. Otherwise, base station-B may transmit the control information to user equipment-a via base station-A over a wired link.

User equipment-a determines the transmission rate $R_{ac}$ of the common data $d_{ac}$ of user equipment-a using the control information (S740). That is, User equipment-a may determine the transmission rate $R(SINR_{ac,B})$ using $SINR_{ac,B}$ and may determine a small value between $R(SINR_{ac,A})$ and $R(SINR_{ac,B})$ as the transmission rate $R_{ac}$ of the common data $d_{ac}$ such that cell-A and cell-B can restore the common data $d_{ac}$ of user equipment-a.

User equipment-a transmits the common data $d_{ac}$ at the transmission rate determined at step S740 to base station-A. For convenience of description, a process in which user equipment-a transmits the private data $d_{ap}$ to base station-A and a process in which user equipment-b transmits the private data $d_{bp}$ to base station-B are omitted in FIG. 10.

Next, the embodiment of the present invention which has been described above with reference to FIGS. 8 to 10 will be described with reference to the case where the user equipment has a multi-antenna. If the user equipment has at least two transmitting antennas, it is possible to achieve spatial multiplexing gain. That is, the user equipment can divide one downlink data into a plurality of data and transmit them.

Figure 11:
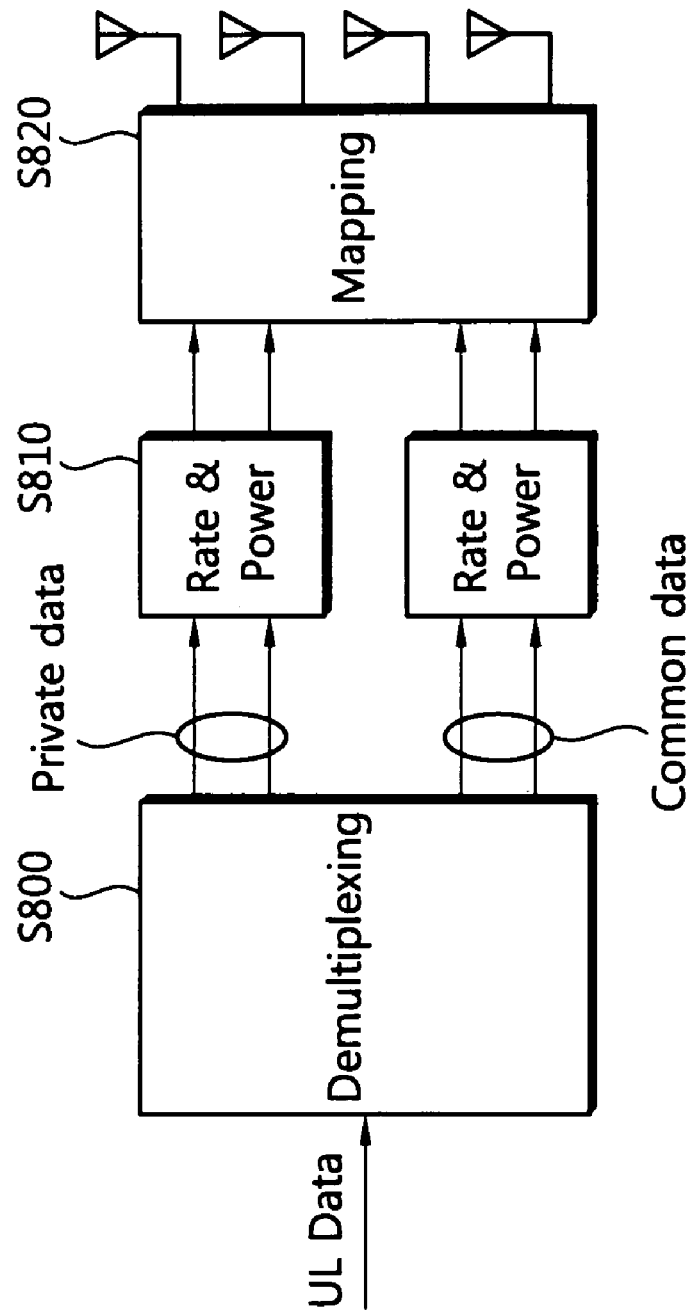
FIG. 11 is a schematic diagram showing the operation of a base station having a multi-antenna in accordance with another embodiment of the present invention.

FIG. 11 is a schematic diagram showing the operation of a user equipment having a multi-antenna in accordance with another embodiment of the present invention.

Referring to FIG. 11, the user equipment divides uplink data into a plurality of data using a demultiplexer (S800). A portion of the plurality of data may be set to common data and another portion may be set to private data. The common data and the private data may comprise a plurality of data streams, respectively. The common data can be restored by the neighboring cells as well as the serving cell. The private data can be restored by the serving cell, but cannot be restored by the neighboring cell.

The user equipment determines the transmission rate and transmission power of the common data and the private data, respectively (S810). The transmission rate of the common data is set to a level at which the common data can be restored by the neighboring cells as well as by the serving cell. The transmission power of the common data and the private data is set to a level that can satisfy the service quality required by both the serving cell and the neighboring cell. The transmission rate and transmission power can be readily determined by those skilled in the art by the method illustrated in the user equipment having a single antenna. That is, the transmission rate and transmission power may be determined with reference to Formulas 6 to 10.

The user equipment maps the common data and the private data to a plurality of transmitting antennas and transmits them to the base station (S820). For example, the common data is mapped to a portion of the plurality of transmission antennas of the user equipment, the private data is mapped to another portion and the common data and the private data are mapped to the other portion, while superpositioning each other, and transmitted.

The method of processing data in a multi-antenna system is similar to the methods of transmitting and processing data in the single antenna system shown in FIGS. 8 to 10. That is, the base station restores the common data received from the user equipment of the neighboring cell, eliminates the interference, and then restores the private data received from the user equipment of the serving cell. However, in the multi-antenna system, the base station may receive a plurality of common data. In this case, the base station may sequentially restore the plurality of common data and eliminate the interference one by one.

As above, although the description has been given to the example in which two neighboring cells cooperate with each other, the present invention is not limited thereto. In the case where at least two cells participate in the cooperation, each of the cells takes an operation between the operations of user equipment-a or user equipment-b shown in FIG. 7. That is, user equipment-a determines the transmission rate and transmission power such that all neighboring cells (cell-B) that participate in the cooperation can restore the common data $d_{ac}$ transmitted by user equipment-a. Moreover, cell-B restores the common data $d_{ac}$ received from the plurality of user equipment-a, eliminates the interference, and then restores the private data $d_{bp}$. If necessary, cell-B may sequentially restore the plurality of common data $d_{ac}$ received from the plurality of user equipment-a and eliminate the interference one by one.

The above is a description for a method of transmitting and receiving data while allowing minimum signal exchange between adjacent cells. However, if signal exchange is allowed between adjacent cells, performance of the system is improved. Accordingly, the description will be given based on assumption that signal exchange is allowed promptly between adjacent cells.

Figure 12:
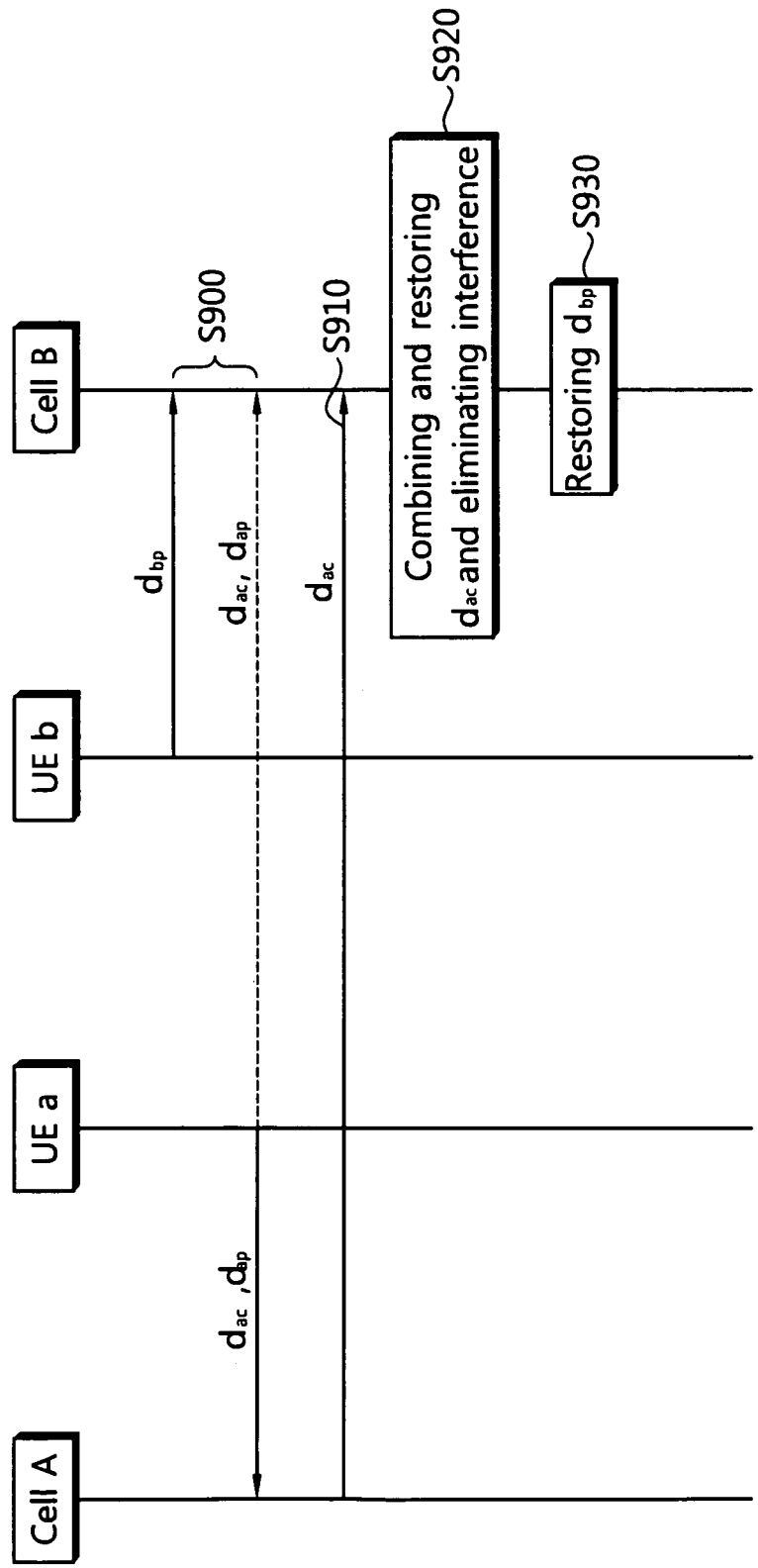
FIG. 12 is a flowchart showing a method of processing data in accordance with another embodiment of the present invention.

FIG. 12 is a flowchart showing a method of processing data in accordance with another embodiment of the present invention. The description will be made based on two neighboring cells shown in FIG. 7 for convenience of description. However, the positions of the user equipments are not limited thereto. It is assumed that each of cell-A and cell-B has a receiver such as a successive interference cancellation (SIC) receiver or a maximum likelihood (ML) receiver. Cell-A and cell-B may share scheduling information on time and frequency resources.

Referring to FIG. 12, cell-B receives private data $d_{bp}$ from user equipment-b and receives private data $d_{ap}$ and common data $d_{ac}$ from user equipment-a (S900). The private data $d_{ap}$ and the common data $d_{ac}$ of user equipment-a are not the data to be transmitted to base station-B. However, since user equipment-a is located near base station-B, the private data $d_{ap}$ and the common data $d_{ac}$ of user equipment-a may be received by base station-B.

Cell-B receives common data $d_{ac}$ of user equipment-a from cell-A (S910). It is possible to exchange data over a wired link between cell-A and cell-B.

Cell-B combines the common data received in the step S900 and the common data received in the step S910, restores them and then eliminates the interference (S920). After eliminating the interference from cell-A, cell-B restores the private data ($d_{bp}$) of the user equipment-b (S930).

Accordingly, it is possible to improve restoring performance for the common data ($d_{ac}$) of the user equipment-a. That is, since a macro diversity gain is obtained by cooperating with cell-A and cell-B, it is possible to achieve higher transmission rate than $R_{Ac}$ that is exemplified in the formula 8.

Figure 13:
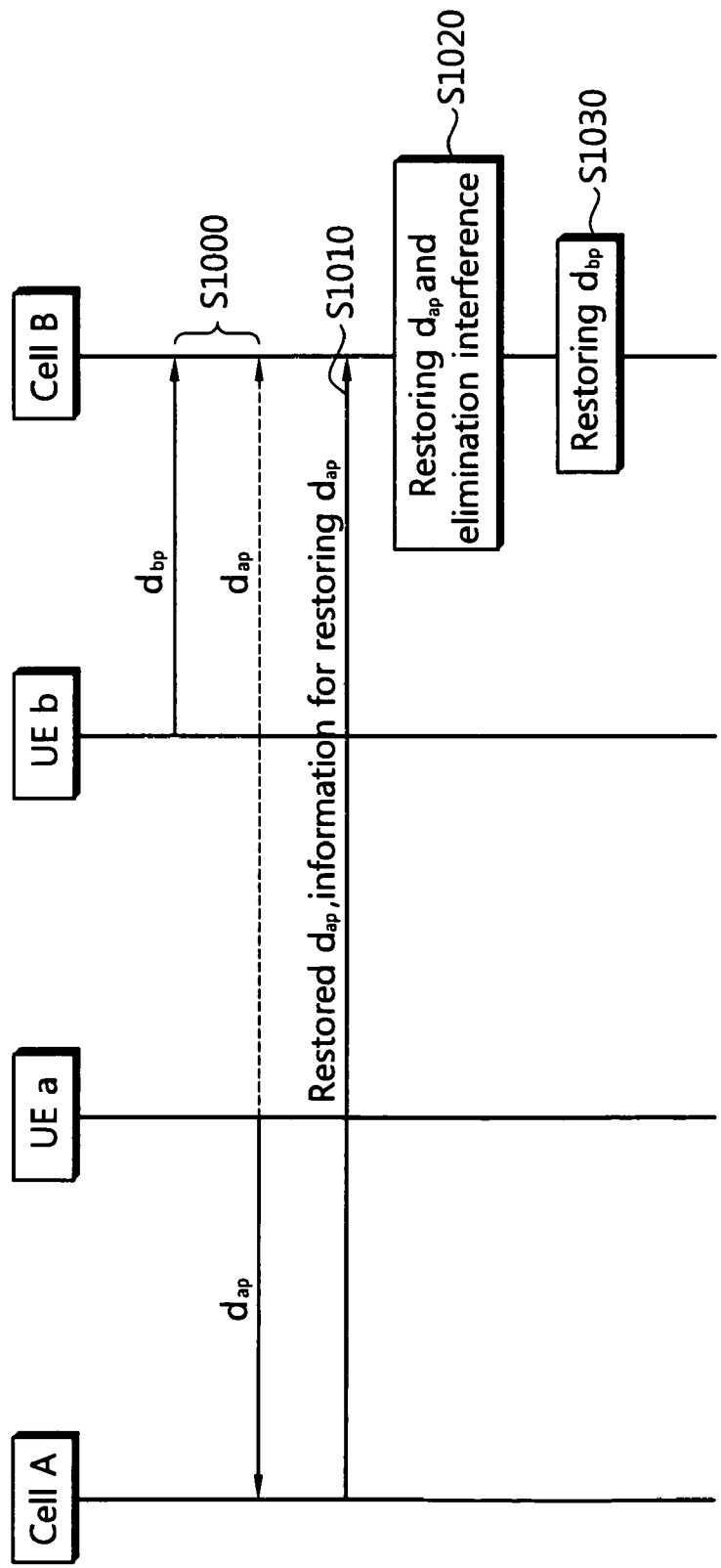
FIG. 13 is a flowchart showing a method of processing data in accordance with another embodiment of the present invention.

FIG. 13 is a flowchart showing a method of processing data in accordance with another embodiment of the present invention. The description will be made based on two neighboring cells shown in FIG. 7 for convenience of description. However, the positions of the user equipments are not limited thereto. It is assumed that each of cell-A and cell-B has a receiver such as a successive interference cancellation (SIC) receiver or a maximum likelihood (ML) receiver. Cell-A and cell-B may share scheduling information on time and frequency resources.

Referring to FIG. 13, cell-B receives private data $d_{bp}$ from user equipment-b and receives private data $d_{ap}$ from user equipment-a (S1000). Hereinafter, the private data $d_{bp}$ from user equipment-b can be referred to a first uplink data and the private data $d_{ap}$ from user equipment-a can be referred to a second uplink data. User equipment-a does not transmit common data $d_{ac}$, but transmit private data $d_{ap}$ with maximum transmission power. The private data $d_{ap}$ of user equipment-a are not the data to be transmitted to cell-B. However, since user equipment-a is located near base station-B, the private data $d_{ap}$ of user equipment-a may be received by cell-B.

Cell-B receives the restored private data $d_{ap}$ and information for restoring the private data $d_{ap}$ from cell-A (S1010). The information for restoring the private data $d_{ap}$ indicates code rate, modulation order, precoding information and the like.

Cell-B restores the private data $d_{ap}$ using the restored private data $d_{ap}$ and information for restoring the private data $d_{ap}$ received in the step S1010, eliminates the interference caused by cell-A (S1020).

After eliminating the interference caused by cell-A, cell-B restores the private data $d_{bp}$ from the user equipment-B (S1030).

Accordingly, although the user equipment-a transmits the private data $d_{ap}$ that cannot be restored by cell-B to cell-B, cell-B can minimize the interference caused by cell-A.

Additionally, cell-B receives the restored private date $d_{ap}$ from cell-A in the step S1010. Here, the private data $d_{ap}$ can be restored by combining private data $d_{ap}$ which cell-A and cell-B respectively receive from user equipment-a. That is, cell-A and cell-B that receive private data $d_{ap}$ in step S1000 may combine received data by exchanging data. Accordingly, it is possible to obtain a macro diversity gain, and to improve performance for restoring data of cell-A.

Even in case that it is possible to exchange signal promptly between adjacent cells, the user equipment need control information to determine transmission rate and transmission power of private data $d_{ap}$. Therefore cell-B may transmit control information to determine transmission rate and transmission power of private data $d_{ap}$ to user equipment-a. Here, cell-B may transmit the control information directly to user equipment-a over a wireless link. Otherwise, cell-B may transmit the control information to user equipment-a via cell-A over a wired link.

Cell-B may receive reference signal (RS) from user equipment-a and user equipment-b to generate control information to determine transmission rate and transmission power of private data $d_{ap}$. For example, the reference signal may be pilot signal or sounding reference signal (SRS). Cell-B may estimate channel using the received reference signal and generate control information using the channel estimation value. For example, the control information may indicate SINR (Signal to Interference and Noise Ratio) on signal from user equipment-a to cell-B, SINR on a combined signal of a signal received by cell-A and a signal received by cell-B, and transmission rate of a private data $d_{ap}$ from user equipment-a.

Additionally, Cell-B may receive a private data $d_{ap}$ that is not restored and information for restoring the private data $d_{ap}$ from cell-A in step S1010. In step S1020, cell-B combines the private data $d_{ap}$ received in step S1000 and the private data $d_{ap}$ received in step S1010 and restores the combined data so that cell-B can eliminates interference caused by cell-A.

A method which is employed may be determined based on whether it is possible to exchange signal between adjacent cells in multi-cell cooperative wireless communication system. That is, if it is possible to exchange signal between adjacent cells, cooperative efficiency can be maximized by exchanging signal between adjacent cells as it is described in FIG. 12 and FIG. 13. If it is not possible to exchange signal between adjacent cells or it takes long time to exchange data between adjacent cells, signal exchanging between adjacent cells may be minimized as it is described in FIG. 8 to FIG. 11.

Figure 14:
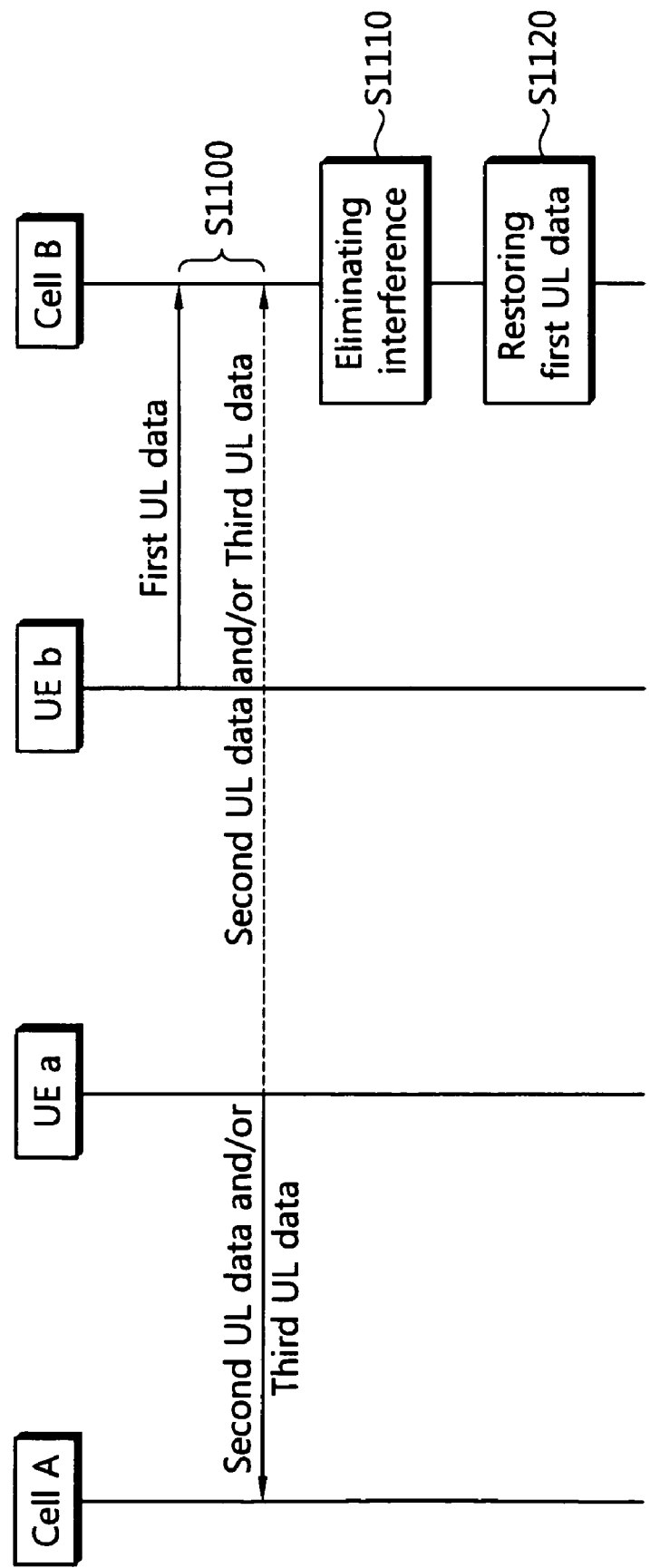
FIG. 14 is a flowchart showing a method of processing data in accordance with another embodiment of the present invention.

FIG. 14 is a flowchart showing a method of processing data in accordance with another embodiment of the present invention. The description will be made based on two adjacent cells shown in FIG. 7 for convenience of description. However, the positions of the user equipments are not limited thereto. It is assumed that each of cell-A and cell-B has a receiver such as a successive interference cancellation (SIC) receiver or a maximum likelihood (ML) receiver. Cell-A and cell-B may share scheduling information on time and frequency resources.

Referring to FIG. 14, cell-B receives a first uplink data from user equipment-b and receives a second uplink data and/or a third uplink data from user equipment-a (S1100). The first uplink data is a private data $d_{bp}$ that can be restored by cell-B, the second uplink data is a private data $d_{ap}$ that can be restored by cell-A, and the third uplink data is a common data $d_{ac}$ that can be restored by cell-A and cell-B.

Cell-B eliminates the interference considering a level of data exchanging ability between cell-A and cell-B (S1110). That is, if it is possible to exchange data between cell-A and cell-B, it can receive the second uplink data which is restored from cell-A and eliminate interference using the data as it is described in FIG. 12 and FIG. 13. If it is not possible to exchange data between cell-A and cell-B or it takes long time to exchange data between cell-A and cell-B, it can receive the third uplink data which is received in step S1100 and eliminate interference using the third uplink data as it is described in FIG. 8 and FIG. 11.

Here, adjacent cells that can exchange signal promptly may be cells that have wireless link or wired link and be connected and managed by one base station. Adjacent cells that cannot exchange signal promptly may be cells that may be connected and managed by different base stations.

Although the operation of the present invention is explained in the relation between base station(s) and user equipment(s) so far, it is not limited thereto. The present invention can be applied to the communication between base station(s) and relay station(s). A part of or the entire user equipments involved in the operation of the present invention can be replaced by relay station(s). In the case where one or more relay station(s) are involved in the operation of the present invention with one or more user equipment(s), the transmission rate of each data considered in the present invention may be determined in consideration of the guard period which exists for the transition of the transmission/reception mode of each relay node.

The present invention may be implemented by hardware, software or a combination thereof. The hardware may be implemented by an application specific integrated circuit (ASIC) that is designed to perform the above-described functions, a digital signal processing (DSP), a programmable logic device (PLD), a field programmable gate array (FPGA), a processor, a controller, a microprocessor, other electronic units, or any combination thereof. The software may be implemented by a module for performing the above functions. The software may be stored in a memory unit and executed by a processor. The memory unit or the processor may employ a variety of means that are well known to those skilled in the art.

The foregoing description of the preferred embodiments of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto and their equivalents.

What is claimed is:

1. A method of transmitting data in a multi-cell cooperative wireless communication system, carried in a base station or a user equipment, the method comprising:
dividing the data into common data and private data;
determining a transmission rate or a transmission power of the common data and the private data, respectively; and
transmitting the common data and the private data at the determined transmission rate or the determined transmission power,
wherein the transmission rate of the common data is determined such that the common data can be restored by a receiving end of a serving cell and a receiving end of a neighboring cell, and
wherein the transmission rate of the common data is set to a small value between the transmission rate at which the common data can be restored by the receiving end of the serving cell and the transmission rate at which the common data can be restored by the receiving end of the neighboring cell.

2. The method of claim 1, wherein the transmission power of the private data or the common data is set to a level that can ensure a predetermined service quality required by the receiving end of the neighboring cell.

3. The method of claim 1, wherein the common data and the private data are transmitted via a multi-antenna.

4. The method of claim 3, wherein the common data is transmitted via a part of the multi-antenna.

5. The method of claim 3, wherein the private data is transmitted via a part of the multi-antenna.

6. An apparatus for transmitting data in a multi-cell cooperative wireless communication system, the apparatus comprising a processor configured to:
divide the data into common data and private data;
determine a transmission rate or a transmission power of the common data and the private data, respectively; and
transmit the common data and the private data at the determined transmission rate or the determined transmission power,
wherein the transmission rate of the common data is determined such that the common data can be restored by a receiving end of a serving cell and a receiving end of a neighboring cell, and
wherein the transmission rate of the common data is set to a small value between the transmission rate at which the common data can be restored by the receiving end of the serving cell and the transmission rate at which the common data can be restored by the receiving end of the neighboring cell.

* * * * *